(12) United States Patent
Hinckley

(10) Patent No.: US 7,532,196 B2
(45) Date of Patent: May 12, 2009

(54) DISTRIBUTED SENSING TECHNIQUES FOR MOBILE DEVICES

(75) Inventor: Kenneth P. Hinckley, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1029 days.

(21) Appl. No.: 10/697,056

(22) Filed: Oct. 30, 2003

(65) Prior Publication Data

US 2005/0093868 A1 May 5, 2005

(51) Int. Cl.
*G09G 5/00* (2006.01)

(52) U.S. Cl. .................................................... 345/156

(58) Field of Classification Search ......... 345/156–158, 345/173–179; 382/187–189; 178/18.01, 178/18.03–18.06
See application file for complete search history.

(56) References Cited

U.S. PATENT DOCUMENTS

| | | | |
|---|---|---|---|
| 5,812,865 A | 9/1998 | Theimer et al. | |
| 6,157,935 A * | 12/2000 | Tran et al. | 715/202 |
| 6,545,669 B1 * | 4/2003 | Kinawi et al. | 345/173 |
| 6,599,130 B2 * | 7/2003 | Moehrle | 434/365 |
| 7,006,881 B1 | 2/2006 | Hoffberg et al. | |
| 7,200,559 B2 * | 4/2007 | Wang | 704/257 |
| 2002/0116205 A1 | 8/2002 | Ankireddipally et al. | |
| 2002/0184373 A1 | 12/2002 | Maes | |
| 2003/0105812 A1 | 6/2003 | Flowers, Jr. et al. | |
| 2003/0145094 A1 | 7/2003 | Staamann et al. | |
| 2003/0222917 A1 * | 12/2003 | Trantow | 345/778 |
| 2005/0030255 A1 * | 2/2005 | Chiu et al. | 345/1.3 |

OTHER PUBLICATIONS

Rekimoto et al., J., "SyncTap: An Interaction Technique for Mobile Networking", *New Generation of IP-Phone Enabled Mobile Devices*, Mobile HCI 2002, pp. 319-323, 2002.

Hinckley et al., K., "Stitching: Pen Gestures that Span Multiple Displays", http://patrickbaudisch.com/publications/2004-Hinckley-AV104-Stitching.pdf, Oct. 6, 2003.

Hinckley, K., "Bumping Object Together as a Semantically Rich Way Forming Connections between Ubiquitous Devices", UbiComp 2003 conference, Oct. 12, 2003.

Hinckley, K., "Synchronous Gestures for Multiple Persons and Computer", Proceedings of the 16th Annual ACM Symposium on User Interface Software and Technology, Vancouver, Canada, pp. 149-158, Nov. 2-5, 2003.

(Continued)

*Primary Examiner*—Regina Liang
*Assistant Examiner*—Shaheda A Abdin
(74) *Attorney, Agent, or Firm*—John D. Veldhuis-Kroeze; Westman, Champlin & Kelly, P.A.

(57) ABSTRACT

Methods and apparatus of the invention allow the coordination of resources of mobile computing devices to jointly execute tasks. In the method, a first gesture input is received at a first mobile computing device. A second gesture input is received at a second mobile computing device. In response, a determination is made as to whether the first and second gesture inputs form one of a plurality of different synchronous gesture types. If it is determined that the first and second gesture inputs form the one of the plurality of different synchronous gesture types, then resources of the first and second mobile computing devices are combined to jointly execute a particular task associated with the one of the plurality of different synchronous gesture types.

28 Claims, 21 Drawing Sheets

OTHER PUBLICATIONS

Hinckley, K., Distributed and Local Sensing Techniques for Face-to-Face Collaboration (Short Paper), Proceedings of the 5th International Conference on Multimodal Interfaces, Vancouver, British Columbia, Canada, pp. 81-84, Nov. 3-5, 2003.

* cited by examiner

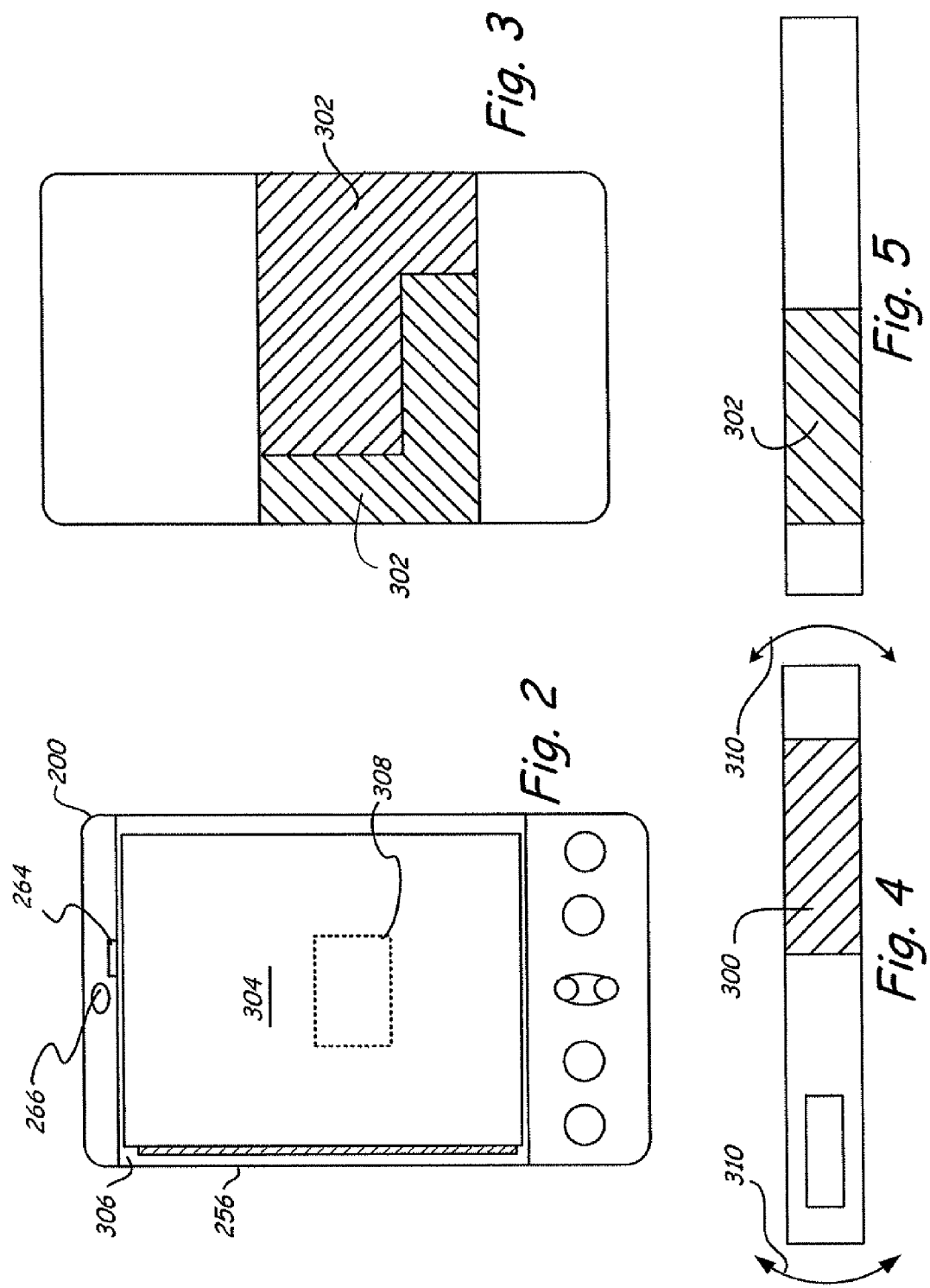

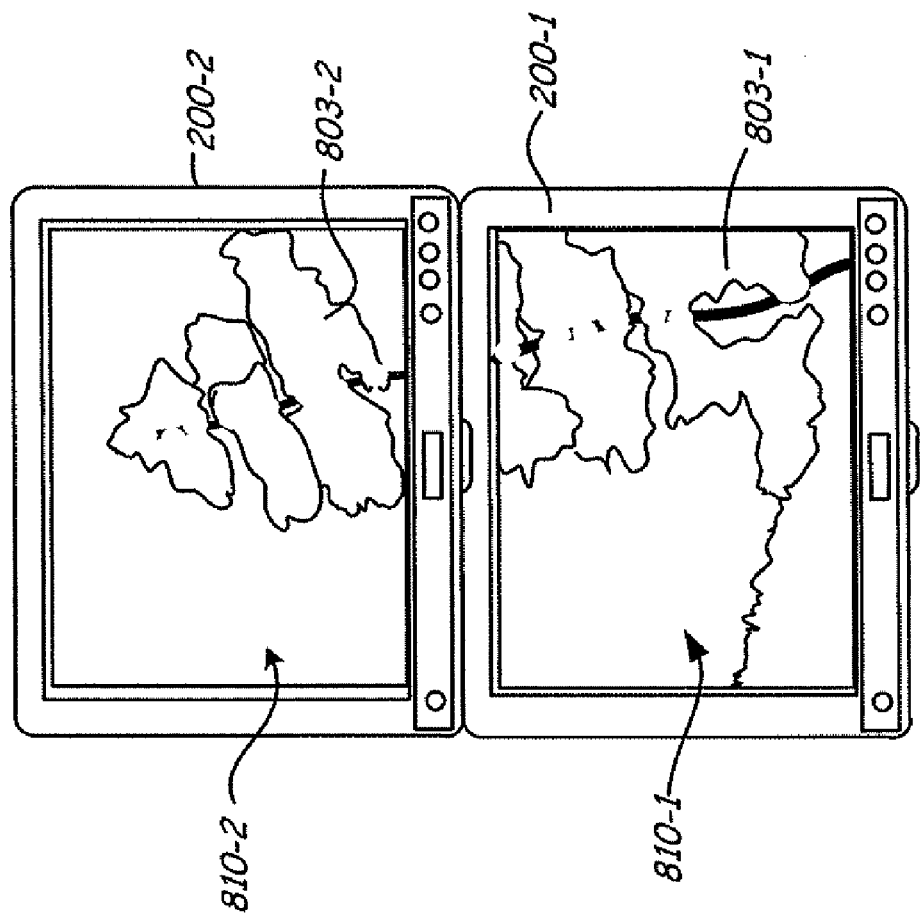
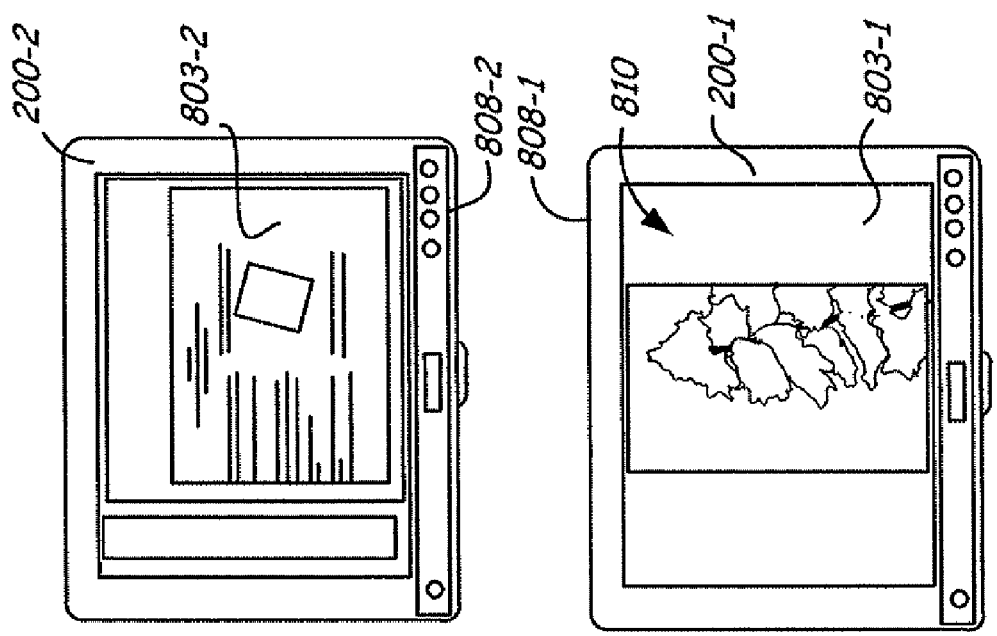
Fig. 13-2
Fig. 13-1

| DEVICE | AXIS | DIRECTION | RESULT (EDGE TO DOCK) |
|---|---|---|---|
| CONNECTING | LEFT - RIGHT | ABOVE | RIGHT EDGE |
| BASE | LEFT - RIGHT | BELOW | |
| CONNECTING | LEFT - RIGHT | BELOW | LEFT EDGE |
| BASE | LEFT - RIGHT | ABOVE | |
| CONNECTING | FWD - BACK | BELOW | BOTTOM EDGE |
| BASE | FWD - BACK | ABOVE | |
| CONNECTING | FWD - BACK | ABOVE | TOP EDGE |
| BASE | FWD - BACK | BELOW | |

Fig. 17

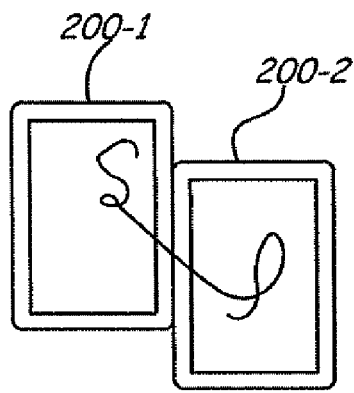
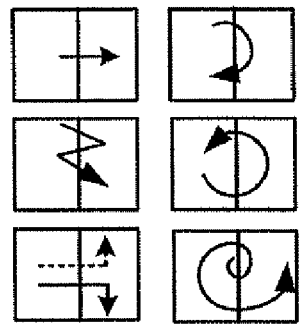
Fig. 21-1          Fig. 21-2
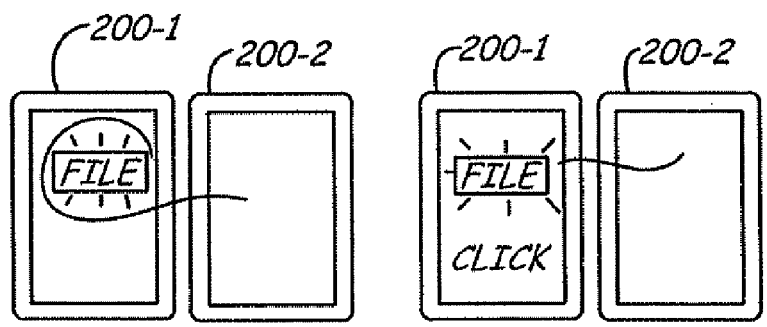
Fig. 22-1          Fig. 22-2
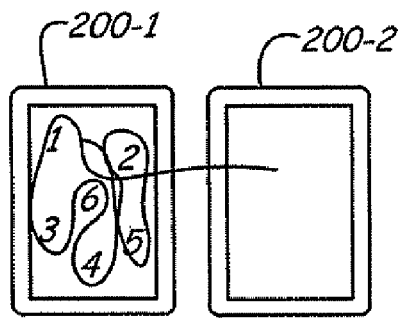
Fig. 23

DISTRIBUTED SENSING TECHNIQUES FOR MOBILE DEVICES

BACKGROUND OF THE INVENTION

The present invention relates to mobile computing devices. In particular, the present invention relates to methods and apparatus for forming distinguished connections between mobile computing devices.

Mobile devices, such as personal information managers (PIMs), tablet PCs, cellular telephones, pagers, watches, and wearable computers typically include one or more buttons, touch screens, or active digitizers through which the mobile device receives explicit instructions from the user. Increasingly, mobile devices are being connected together via a wireless or wired network for purposes of communication, sharing of data and collaborative work.

Humans have evolved to function within a fabric of social connections and collaboration. People work on problems in groups, and indeed the entire field of computer-supported collaborative work (CSCW) is devoted to technological support of such groups. Many user tasks and activities revolve around communication, which inherently involves at least two persons. Furthermore, with the burgeoning use of the internet, and research trends in ubiquitous computing and distributed systems, human-computer interaction often involves more than one computer. Yet the prior art offers few examples of real-time interaction techniques that leverage the simultaneous data streams generated by multiple users and multiple computers.

Establishing meaningful connections between devices is a problem of increasing practical concern for ubiquitous computing. Wireless networking and location sensing can allow devices to communicate and may provide information about proximity of other devices. However, with many devices nearby, how a user specifies which devices to connect to remains a problem. Furthermore, connections require semantics: What is the connection for? Is the user collaborating with another user? Is the user combining the input/output resources of multiple devices to provide increased capabilities? Presently, there exists a lack of techniques to intuitively form semantically rich connections between devices.

Few prior art devices are responsive to the manner in which the user is holding the device. As a result, the user is forced to enter explicit instructions into the device to achieve various functions. In light of this, mobile devices are needed that can sense how they are being handled in order to perform certain background functions that expand the functionality of the mobile device without requiring the user to perform any additional actions.

There are also relatively few prior art techniques for forming distinguished connections between multiple devices. One prior art technique is "Smart-Its Friends", which is described in the paper Holmquist et al., *Smart-Its Friends: A Technique for Users to Easily Establish Connections between Smart Artefacts,* Ubicomp 2001, Springer-Verlag, 116-122. Smart-Its Friends allows a user to connect a pair of accelerometer-augmented handheld devices by holding the two devices together and shaking them. An identical pattern on the accelerometers suggests a shared context between the devices. The paper suggests using this to form a dedicated connection between the two shaken devices: if a "friend" device enters or leaves proximity, the user's device beeps, thus creating "a sense of awareness" of the comings and goings other users. One problem with Smart-Its Friends is that only this one type of connection can be formed.

Another prior art techniques for forming distinguished connections between multiple devices is "ConnecTables", which is described in the paper Tandler et al., *ConnecTables: dynamic coupling of displays for the flexible creation of shared workspaces,* UIST 2001, 11-20. ConnecTables are wheeled tables with mounted LCD displays that can be rolled together so that the top edges of two LCD's meet. The devices then recognize one another through a radio frequency identification (RFID) tag and RFID reader mounted on each device. The displays can only be joined at the top edge (i.e., when they face one another). When joined, two ConnecTables create a shared workspace in which users can pass objects back and forth. With ConnecTables, other types of connections between the two display devices are not supported. Further, since the displays are part of the furniture and cannot be picked up, fluid transitions between shared work and private or semi-private work is not possible.

Much recent discussion has focused on the promise of the wireless internet, yet there has been relatively little work on techniques that help users of mobile devices to collaborate with others and to share information with other persons. For example, when attempting to copy a file between mobile devices, it remains difficult for users to name a device to connect to, specify how to connect, or indicate what information to share.

SUMMARY OF THE INVENTION

Methods and apparatus of the invention allow the coordination of resources of mobile computing devices to jointly execute tasks. In the method, a first gesture input is received at a first mobile computing device. A second gesture input is received at a second mobile computing device. In response, a determination is made as to whether the first and second gesture inputs form one of a plurality of different synchronous gesture types. If it is determined that the first and second gesture inputs form the one of the plurality of different synchronous gesture types, then resources of the first and second mobile computing devices are combined to jointly execute a particular task associated with the one of the plurality of different synchronous gesture types.

BRIEF DESCRIPTION OF THE DRAWINGS

FIG. 3 is a back view of the mobile device of FIG. 1.

FIG. 4 is a left side view of the mobile device of FIG. 1.

FIG. 5 is a right side view of the mobile device of FIG. 1.

FIGS. 12-1 through 12-3 are diagrammatic illustrations of a task jointly executed by two mobile computing devices as a result of a bumping type synchronous gesture.

FIGS. 13-1 and 13-2 are diagrammatic illustrations of a task jointly executed by two mobile computing devices as a result of a bumping type synchronous gesture.

FIGS. 14-1 and 14-2 are diagrammatic illustrations demonstrating one type of visual feedback of the formation and breaking of a synchronous gesture connection.

FIGS. 15-1 and 15-2 are diagrammatic illustrations of a task jointly executed by two mobile computing devices as a result of a bumping type synchronous gesture.

FIG. 17 is a table mapping observed synchronous spikes, above or below a running average threshold, for two mobile devices and for the accelerometer sensing axis.

FIGS. 18-1 through 18-7 are diagrammatic illustrations of various features of some embodiments of the invention.

FIGS. 19-1 and 19-2 are diagrammatic illustrations of stitching type synchronous gestures.

FIG. 19-3 is a three state model of a pen or stylus input with proximity tracking.

FIGS. 20-1 through 32 are diagrammatic illustrations of stitching type synchronous gestures and related tasks or features.

DETAILED DESCRIPTION OF THE PREFERRED EMBODIMENTS

The present invention includes distributed sensing techniques, for mobile devices, using "synchronous gestures." Synchronous gestures are patterns of activity, contributed by multiple users (or one user with multiple devices), which span a distributed system and take on a new meaning when they occur together in time. These patterns can occur in parallel and in exact synchrony, or they can be partially overlapped or occur in a particular sequence. In general, in synchronous gestures the complementary portions of a signal are contributed by different devices or participants, and the signal cannot easily be recognized until the disparate portions are brought together and analyzed as a whole.

The invention is particularly beneficial with tablet computers or other mobile devices that can communicate with one another (for example using wireless network, peer-to-peer radio frequency communication, or other means of establishing communication between a plurality of devices). In some embodiments appropriate sensors are added to traditional mobile devices in order to detect the synchronous gestures. The following description of example embodiments of the invention discusses various sensor types, as well as various distributed sensor patterns which can be used to generate the synchronous gestures.

Figure 1:
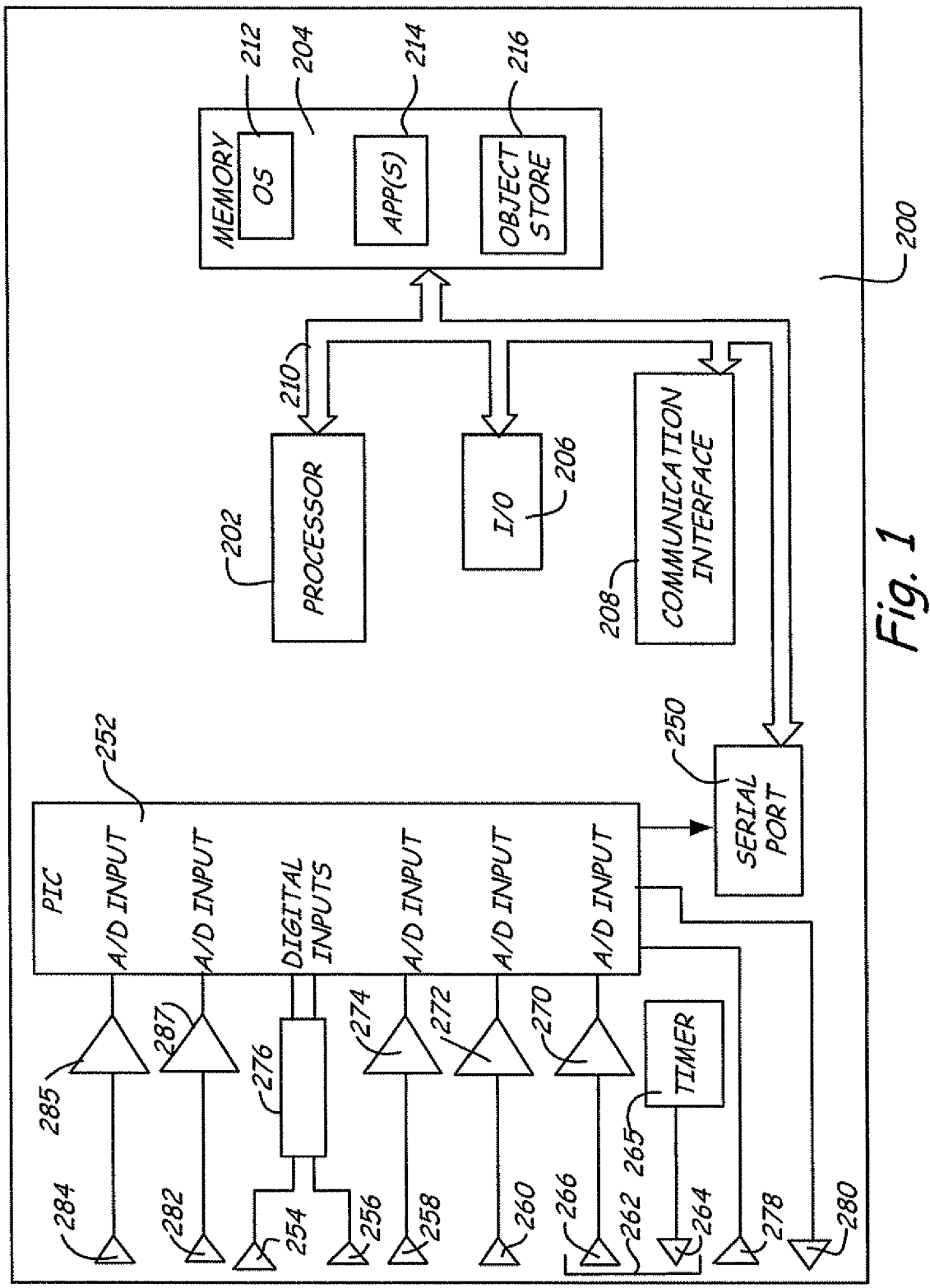
FIG. 1 is a block diagram of the components of a mobile device under one embodiment of the present invention.

FIG. 1 is a block diagram of a mobile device 200, which is an exemplary environment for embodiments of the present invention. Mobile device 200 includes a microprocessor 202, memory 204, input/output (I/O) components 206, and a communication interface 208 for communicating with remote computers or other mobile devices. In one embodiment, the aforementioned components are coupled for communication with one another over a suitable bus 210.

Memory 204 is a computer readable media, which can be any available media that can be accessed by processor 202 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, TOM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by processor 202. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The particular computer readable medium used in a mobile device is a function of the size of the device and the power capacity of the device. For example, a tablet PC will typically include one or more disk drives where as a PIM will typically only include a random access memory (RAM) with a battery back-up module (not shown) such that information stored in memory 204 is not lost when the general power to mobile device 200 is shut down.

A portion of memory 204 is-preferably allocated as addressable memory for program execution, while another portion of memory 204 is preferably used for storage.

Memory 204 includes an operating system 212, application programs 214, and an object store 216. During operation, operating system 212 is preferably executed by processor 202 from memory 204. Operating system 212, in one preferred embodiment, is a WINDOWS® CE brand operating system commercially available from Microsoft Corporation. In Tablet PC embodiments, Windows® XP brand operating system available from Microsoft Corporation is utilized. Operating system 212 is preferably designed for mobile devices, and implements database features that can be utilized by applications 214 through a set of exposed application programming interfaces and methods. The objects in object store 216 are maintained by applications 214 and operating system 212 at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial, parallel, USB, or Firewire communication connection, all of which are capable of transmitting streaming information.

Input/output components 206 include a variety of input devices that have previously been found on mobile devices such as a touch-sensitive screen or transparent tablet overlay sensitive to properties of a special stylus including position, proximity to the screen, pressure, azimuth, elevation, which end of the stylus is being used (e.g. writing tip on one end, eraser on the other end) and possibly a unique ID encoded in the stylus, buttons, rollers, and a microphone as well as a variety of output devices including an audio generator, a vibrating device, and a display. The devices listed above are by way of example and need not all be present on mobile device 200.

Mobile device 200 also includes additional input devices under the present invention. Under one embodiment, these input devices are connected to the mobile device through a separate serial port 250 and a peripheral interface controller (PIC) microprocessor 252. In other embodiments, these additional devices are connected to processor 202 through communication interface 208 and PTC microprocessor 252 or through PIC microprocessor 252 directly. Under one embodiment, a microchip 16F877 peripheral interface controller is used as the PIC microprocessor. In still further embodiments, PIC microprocessor 252 is not present and the input devices are connected to processor 202 through various ports such as serial port 250 or through communication interface 208, or through memory-mapped I/O or direct connection to the system processor(s).

Under the embodiment of FIG. 1, the additional input devices include a set of touch sensors such as touch sensors 254 and 256 which identify when a user is holding mobile device 200. Touch sensors 254 and 256 are provided to a separate peripheral interface controller microprocessor 276 which converts the touch signals into digital values and provides the digital values to PIC microprocessor 252. In other embodiments, touch sensors 254 and 256 are connected directly to analog or digital inputs in PIC microprocessor 252 instead of being connected to PIC 276 or are connected to processor 202.

The input devices also include a dual axis linear accelerometer tilt sensor 258 capable of detecting forward/back tilt, left/right tilt, and linear accelerations such as those resulting from vibrations or movement.

The input devices also optionally include one or more of a light sensor 260, a proximity sensor 262 consisting of an infrared transmitter 264 and an infrared receiver 266, a digital compass (e.g. a single or multiple axis magnetometer) 284, and a gravity switch 282. The sensing signals from the infrared receiver 266, linear accelerator 258, light sensor 260, digital compass 284, and gravity switch 282 may be provided through respective amplifiers 270, 272, 274, 285 and 287 to analog inputs of PIC microprocessor 252. These analog inputs are connected to analog-to-digital converters within PIC microprocessor 252. In other embodiments, the sensors provide a digital output and thus are connected to digital inputs on the microprocessor. In further embodiments, the input devices also include a temperature sensor.

PIC microprocessor 252 also includes a connection to the power bus of mobile device 200, which is shown as connection 278 in FIG. 1. PIC microprocessor 252 also includes a connection to a power switch 280, which enables PIC microprocessor 252 to turn mobile device 200 on and off. Note that PIC microprocessor 252 always receives power and, under one embodiment, is able to control which of the sensors receives power at any one time. This allows PIC microprocessor 252 to manage power consumption by only sending power to those sensors that it anticipates will need to be active.

Under one embodiment, PIC microprocessor 252 packets representing the state of these sensors at a rate of approximately 400 samples per second through serial port 250. In some embodiments, samples are reported at lower speeds to conserve power and processing resources. Some sensors may be reported at different sampling rates than others (e.g. tilt may be updated more frequently than touch).

Figures 1, 12:
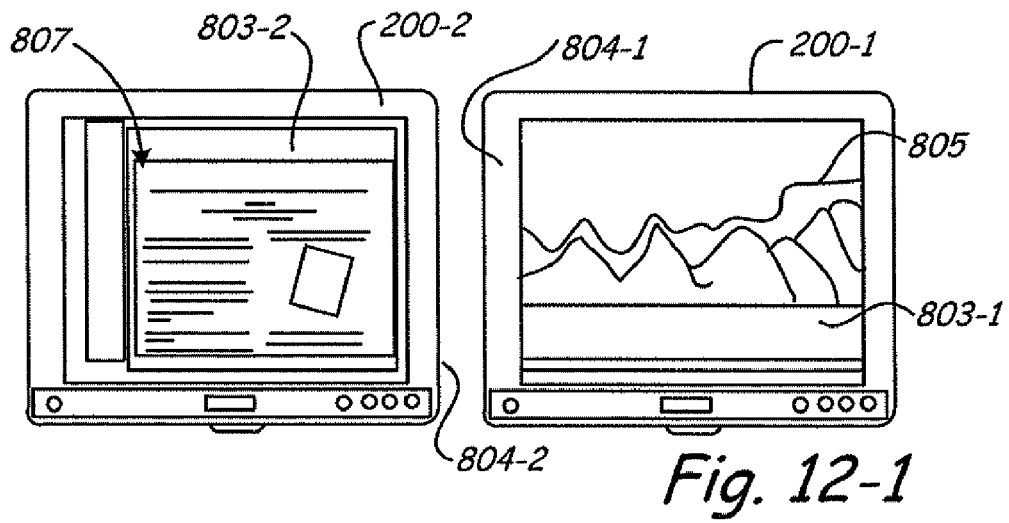
Figures 1, 18:
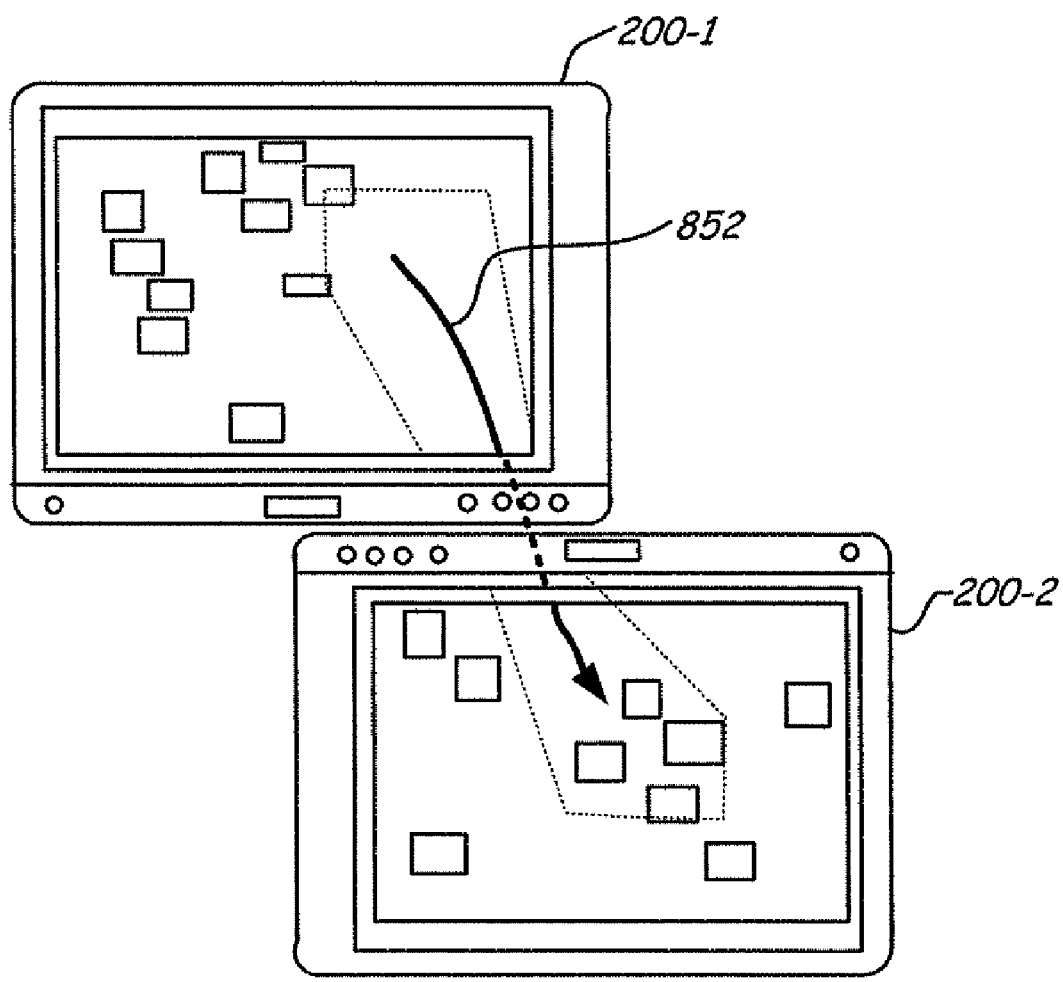
Figures 2, 18:
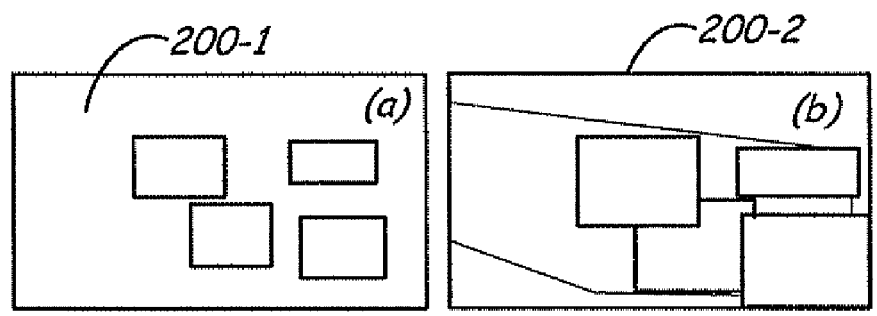
Figures 3, 18:
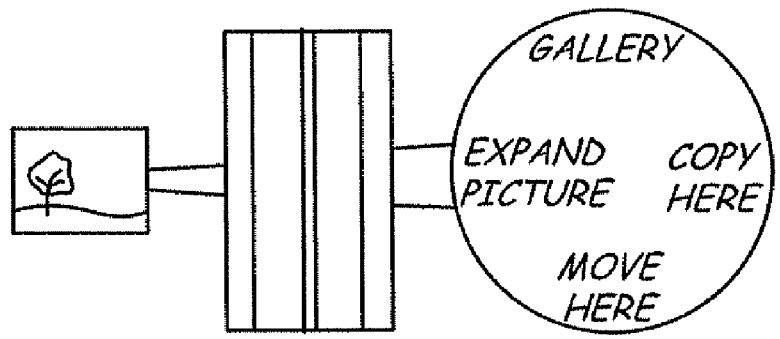
Figures 4, 18:
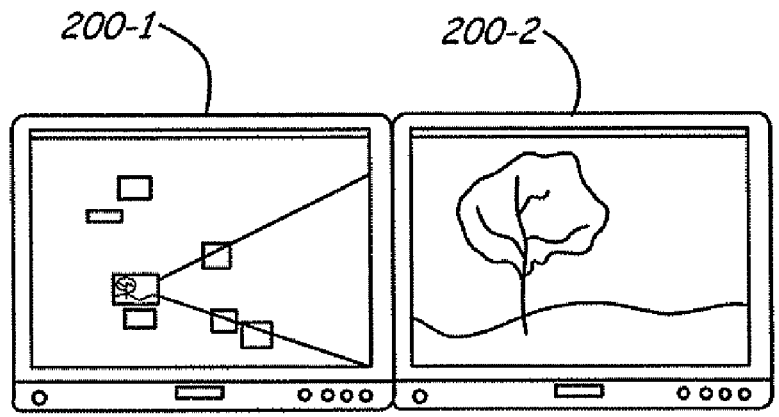
Figures 5, 18:
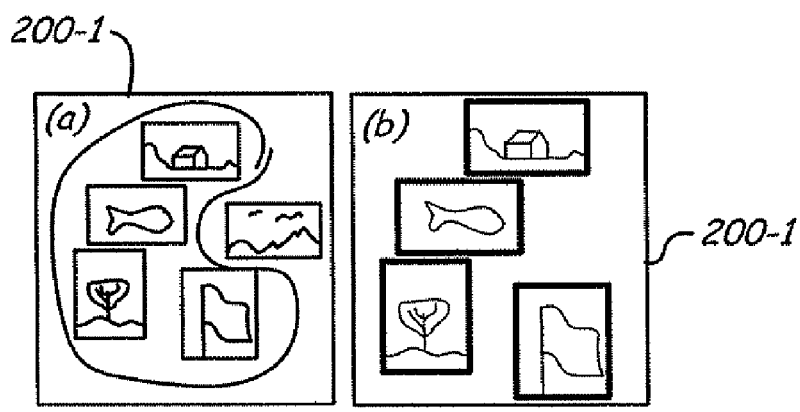
Figures 6, 18:
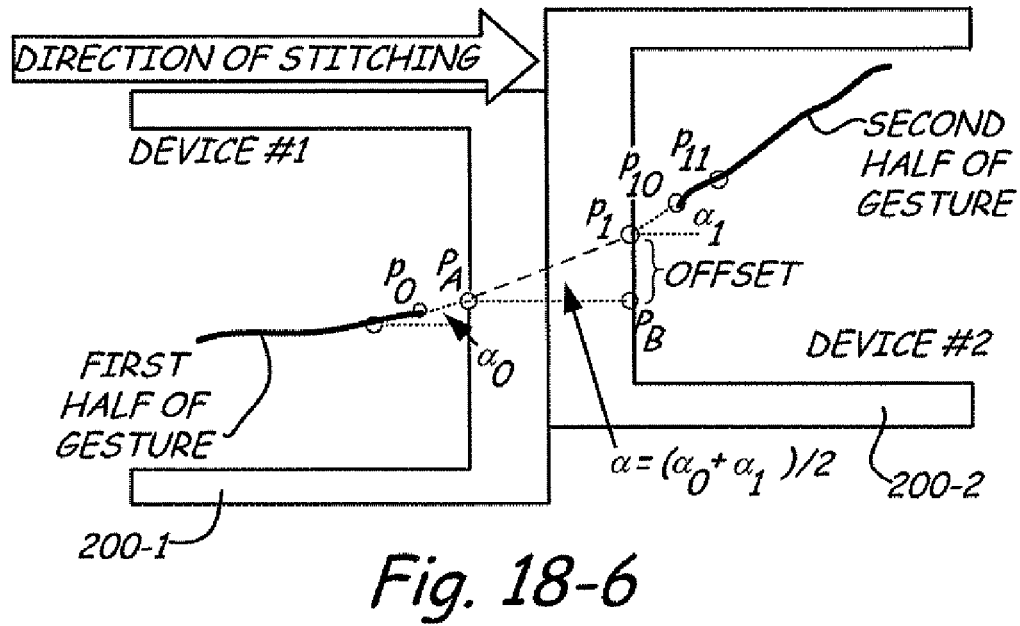
Figures 7, 18:
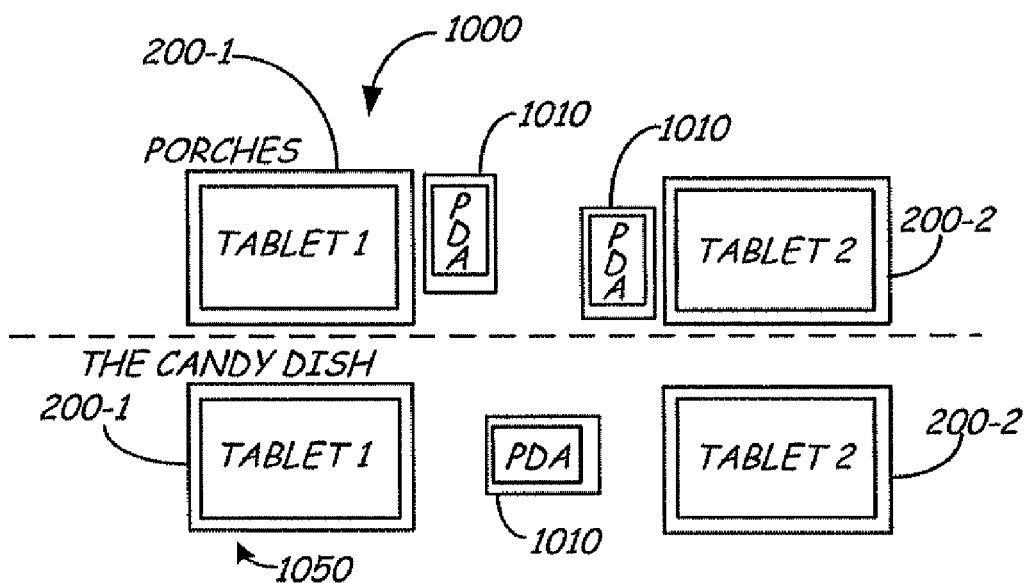

Under one embodiment, the touch sensors are conductive or capacitive touch sensors that are divided into two regions. In other embodiments, these sensors are implemented as a single detector pad. Under one embodiment, the touch sensors are spread across the back and sides of mobile device 200. This is shown in more detail in FIGS. 3-5 which show a back, left side view and right side view of the outside of mobile device 200. In FIGS. 3, 4, and 5, touch sensor 254 is shown as two regions 300 and 302. Region 300 extends from the left side to the back of mobile device 200 and region 302 extends from the right side to the back of mobile device 200. When a user touches either section 300 or 302, the capacitance associated with the touched section changes indicating that the user has touched the device. Note that although the touch sensors are shown on the exterior of the device in the embodiment of FIGS. 3-5, in other embodiments, the touch sensor is located beneath an outer covering of the device.

Figures 2, 12:
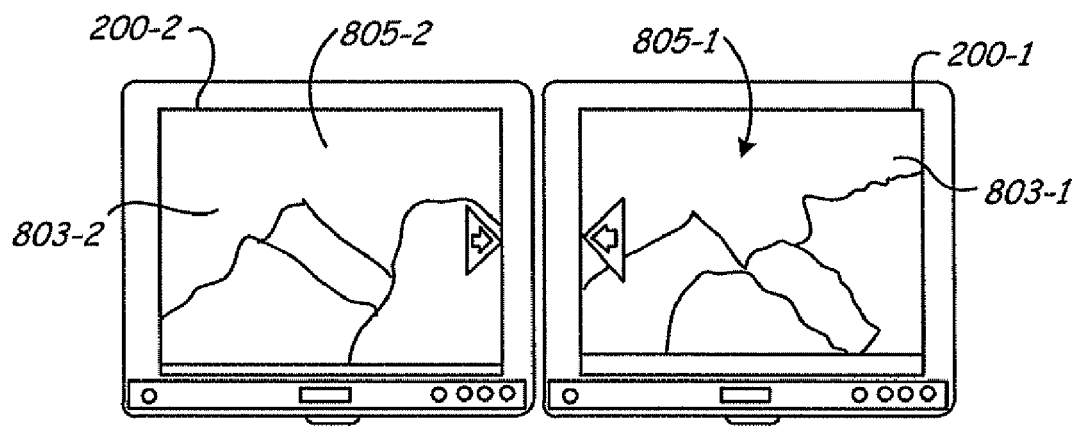
Figures 3, 12:
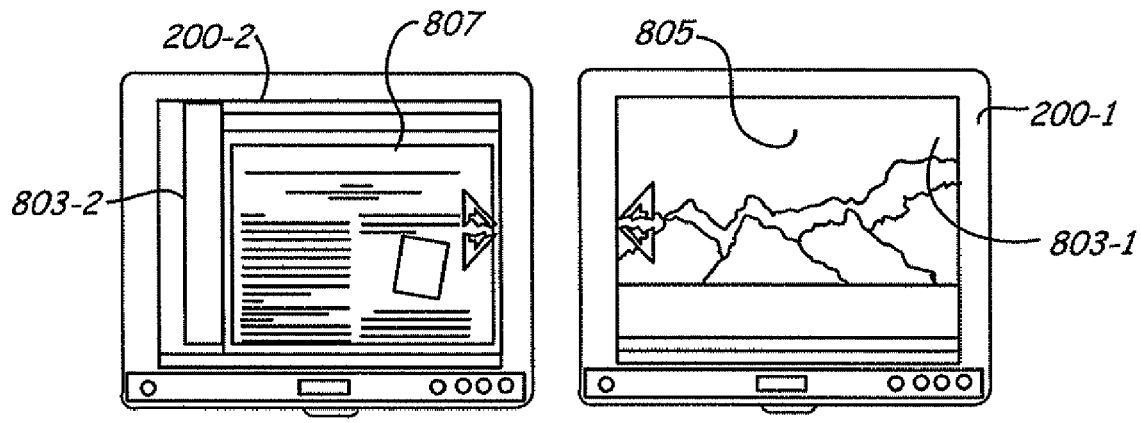
Figures 2, 14:
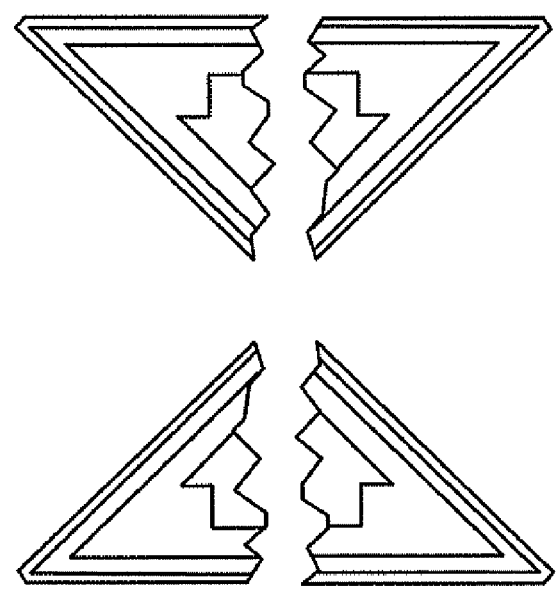
Figures 1, 14:
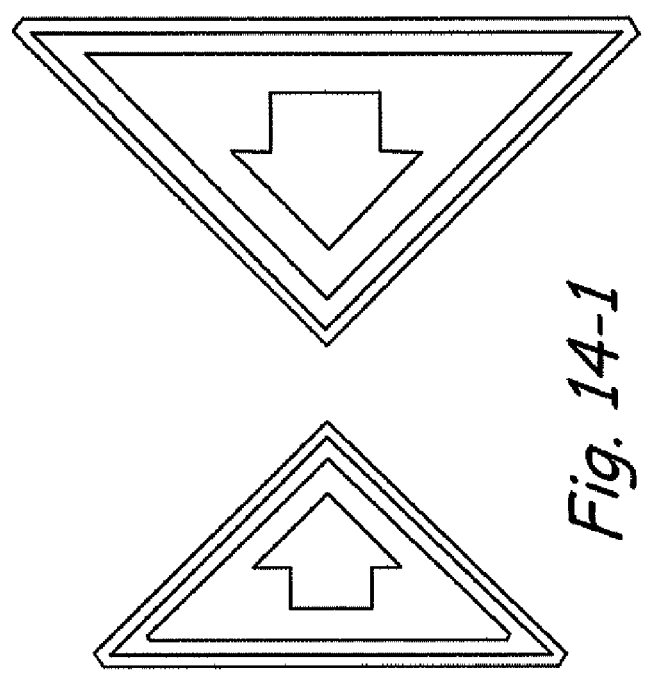

Touch sensor 256 is shown in FIG. 2, which is a front view of mobile device 200 Tin the embodiment of FIG. 2, touch sensor 256 is located on the left bezel of display screen 304. In other embodiments, touch sensor 256 is located on the outer casing on the front portion of mobile device 200, but not necessarily on bezel 306 of mobile device 200.

In some embodiments, the touch sensors described above are realized using a plurality of independent touch sensors that each provides a separate touch signal. In other embodiments, the touch sensors are replaced with position sensors that indicate the location where the user is touching the device. Those skilled in the art will recognize that additional touch sensors may be added to the mobile device within the scope of the present invention.

Figure 7:
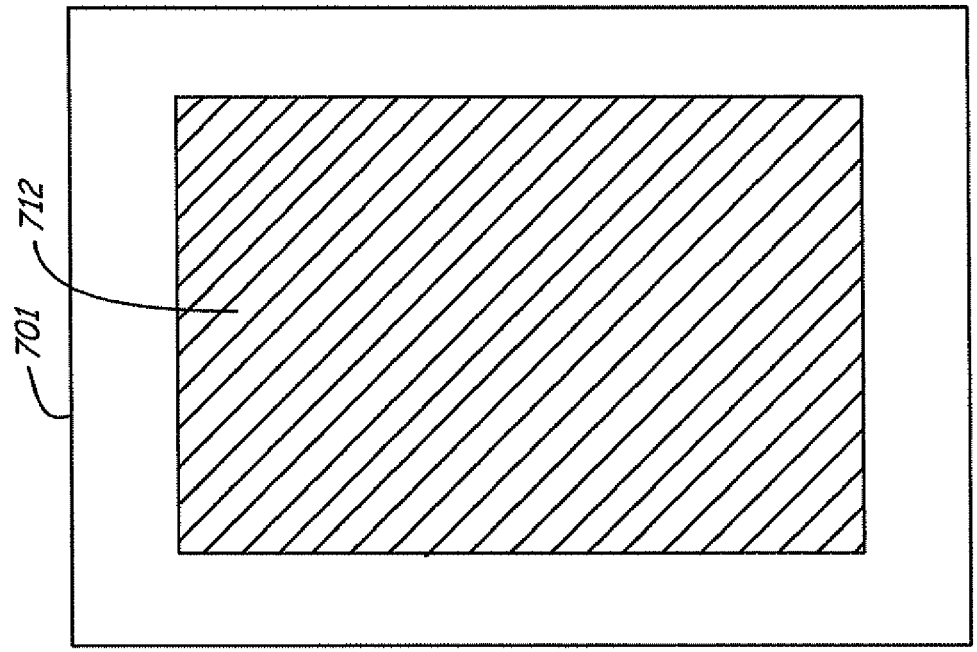
FIG. 7 is a back view of the mobile device of FIG. 6.
Figure 6:
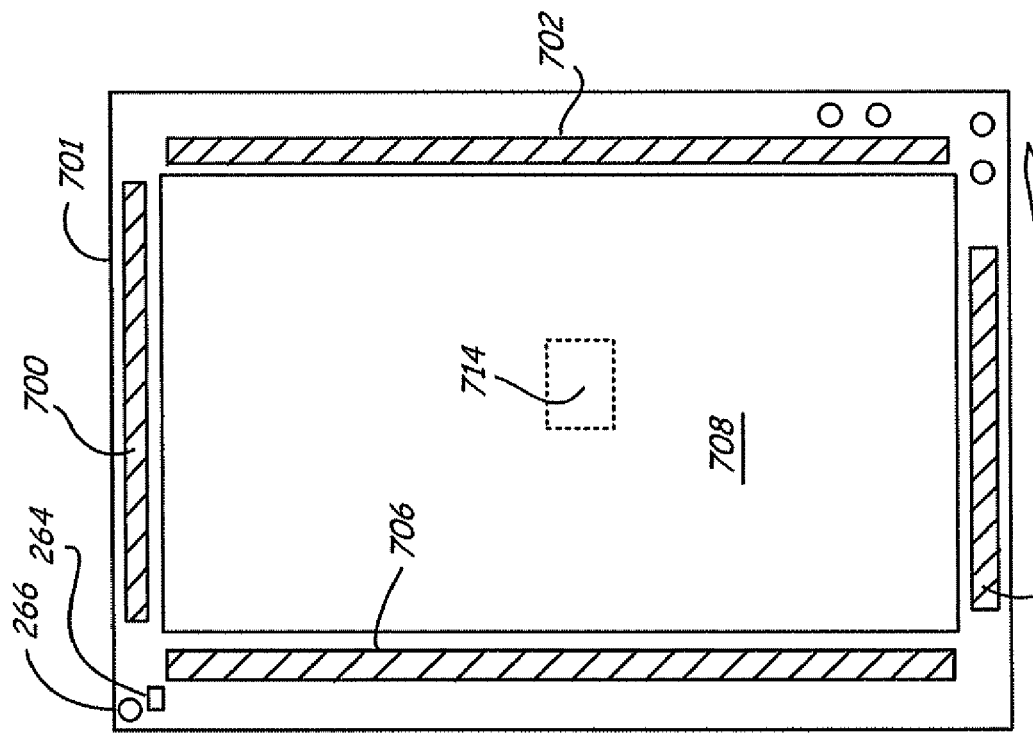
FIG. 6 is a front view of a second embodiment of a mobile device.

FIGS. 6 and 7 indicate locations for touch sensors under one embodiment of a tablet PC. In FIG. 6, touch sensors 700, 702, 704, and 706 are located at various locations around the perimeter of a display 708 on the front of tablet PC 701. Sensors associated with display 708 are able to detect the location of a stylus 710 when it is near display 708 using inductive coupling between display 708 and conductors in stylus 710. Under some embodiments, the sensors associated with display 708 are able to detect the proximity of stylus 710 as well as the azimuth of the stylus.

FIG. 7 provides a back view of tablet PC 701 and shows a touch sensor 712 located on the back surface of the tablet PC.

Tablet PC 701 can be of a slate form, in which the tablet PC only includes the display for input and does not include a keyboard. The slate forms of the tablet PC can be used with a docking station to provide a connection to other input devices and memory devices.

In other embodiments, the tablet PC is a convertible device with a keyboard. Under one convertible embodiment, the keyboard is attached to the display through a pivoting connection that allows the tablet PC to be in either a closed state or an open state. In such embodiments, the display is embedded in a top portion of the tablet PC and the keyboard is embedded in a bottom portion of the tablet PC. In the closed state, the top and bottom portions of the tablet PC are brought together so that the keyboard is hidden between the top and bottom portions while the display is visible on the exterior of the top portion. In the open state, the display pivots so that it faces the keyboard.

In another convertible embodiment, the display portion of the tablet PC is detachable from a keyboard and extended device portion, which can contain various disk drives and additional memory. In such embodiments, the back touch sensor 712 can be located on the back of the display portion or on the back of the keyboard portion.

Tilt sensor 258 is shown as a single dotted element 308 in FIG. 2 and element 714 in FIG. 6. The tilt sensor is embedded within the casing of mobile device 200 and 701 and in one embodiment is located at a point about which users typically pivot mobile device 200 and 701 when tilting the device. Note that the tilt sensor's position within the mobile device is unimportant as it senses only the angle of its physical attitude with respect to gravity.

Under one embodiment, an Analog Devices ADXL202JE two-axis linear accelerometer is used for tilt sensor 258. Such a sensor detects forward/backward tilt, shown by arrows 310 of FIG. 4, and left/right tilt, shown in the bottom view of FIG. 2 as arrows 312. The sensor also responds to linear accelerations, such as those resulting from shaking the device, vibrations, or other movement, within ±2 units of Earth's gravity, enabling the system to detect vibrations and hard contact forces. Hard contact forces can cause sharp spikes in the accelerometer data. In an example embodiment, the system maintains a sampling rate of approximately 120 Hz to reliably sense the direction and magnitude of such spikes. In one implementation embodiment, the duty cycle period of the accelerometer is set to 1 ms for quick sampling, and the sampling bandwidth is set to 10 Hz. This helps to smear out sharp spikes over time, making them detectable at a modest sampling rate, while removing undesired high frequencies from the signal.

Typically, the tilt sensor has a response curve both in the forward/back direction and left/right direction with the form:

$$\text{Angle} = \sin^{-1}\left(\frac{T - T_c}{k}\right) \qquad \text{EQ. 1}$$

where T is the tilt sensor value, $T_c$ is the sensor value at 0° tilt, and k is a gain parameter. In embodiments where the sensor cannot detect the sign of the gravity vector, it is unable to determine if the user is holding the device with the display facing up or down. Gravity switch 282 of FIG. 1 is thus provided in some embodiments to indicate whether the display is facing the ground. In other embodiments, a three-axis accelerometer is used to provide the sign of the gravity vector.

In addition, the tilt sensor does not respond to rotation about an axis running from the front to the back of the mobile device. Thus, the tilt sensor is unable to sense the spinning of the mobile device on its back when laid on a flat table. Digital magnetic compass 284 of FIG. 1 is thus provided in some embodiments to indicate this type of rotation. In other embodiments, solid state gyros are used instead of the compass. In further embodiments, a multiple axis magnetometer may be used in lieu of the digital compass, and combined with the tilt sensor values, to improve the robustness of the sensed compass direction.

When present, gravity switch 282 and digital compass 284 are also internal to mobile devices 200 and 701. They are not shown in FIGS. 2 and 6 to reduce the complexity of FIGS. 2 and 6.

Note that the additional input devices of FIG. 1 do not all have to be present under the present invention. Different embodiments of the invention will use different numbers of and different combinations of these additional sensors. Further, additional sensors may be added without affecting the functions of the sensors discussed in the present application.

Transmitter 264 and receiver 266 of proximity sensor 262 are shown in FIGS. 2 and 6. In the embodiment of FIG. 2, transmitter 264 is shown below and to the right of receiver 266, and both the transmitter and receiver are located at the top front of mobile device 200.

Under one embodiment, a timer 265 drives transmitter 264 at 40 kilohertz and transmitter 264 is an infrared light emitting diode with a 600 beam angle. Under such embodiments, receiver 266 is also an infrared receiver that is capable of operating at the same frequency as transmitter 264. The light produced by transmitter 264 bounces off objects that are near mobile device 200 and the reflected light is received by receiver 266. Receiver 266 typically has an automatic gain control such that the strength of the received signal is proportional to the distance to the object. In a further embodiment, multiple light emitting diodes with different beam angles may be combined to improve sensor response to both distant objects (using a narrow collimated beam angle, e.g. 5°) as well as objects that are not directly in front of the sensor (using a wide beam angle).

The mobile devices 200 and 701 shown in FIGS. 1-7 are examples of mobile devices having sensors which can be used to recognize a synchronous gesture between two mobile devices. However, the present invention is not limited to use with mobile devices having the particular sensors and/or configurations shown in these FIGS., but rather, these FIGS. provide examples of suitable mobile devices.

Figure 8:
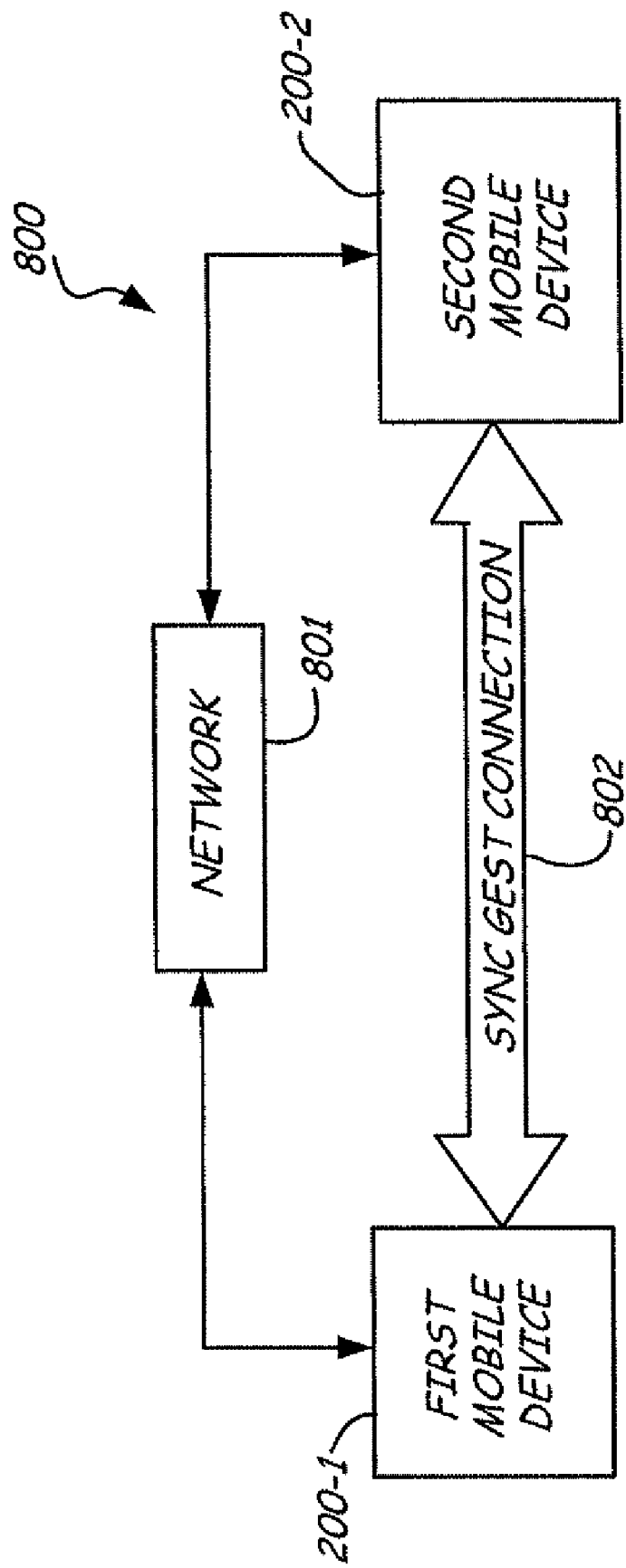
FIG. 8 is a block diagram of a system including two mobile device configured to recognize synchronous gestures and to establish a connection to jointly accomplish a task defined by the synchronous gesture.

FIG. 8 is a block diagram illustrating a system 800 including a first mobile device 200-1, a second mobile device 200-2, and a network 801. The mobile devices can be, for example, tablet PC's (tablets) or other suitably configured mobile computers. The network 801 can be a wired or wireless network. While in a typical environment network 801 would provide communications between a larger number of computing devices, in some embodiments network 801 can provide communications exclusively between mobile devices 200-1 and 200-2. As illustrated in FIG. 8, in system 800 a "synchronous gesture connection" 802 exists between the mobile devices. As used herein, a "synchronous gesture connection" means that a connection for purposes of jointly executing a particular task has been established. The synchronous gesture connection is established, typically over network 801, upon the detection of a synchronous gesture. Detection of a synchronous gesture involves detection of complementary portions of a signal at devices 200-1 and 200-2.

Figure 9:
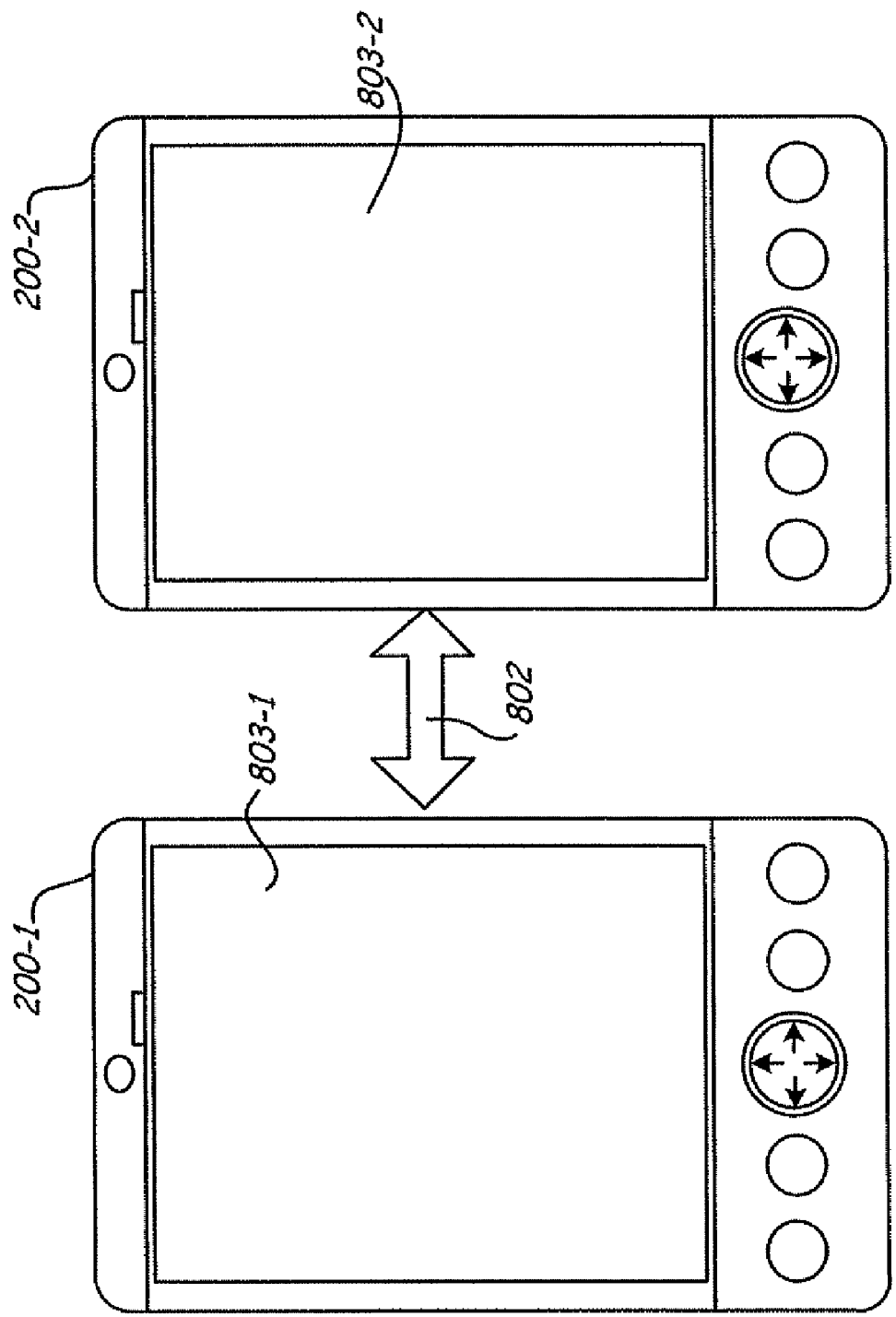
FIG. 9 is a diagrammatic illustration of the system shown in FIG. 8.

FIG. 9 illustrates a synchronous gesture connection 802 between mobile devices 200-1 and 200-2. In FIG. 9, displays 803-1 and 803-2 of the mobile devices are also shown. Frequently, the synchronous gesture connection will utilize the displays, either a mechanism for recognizing the synchronous gesture, or as a mechanism to implement the synchronous gesture (for example via the joint display of information, or via an illustration of the successful transfer of information). For simplicity, the network connection is not illustrated in FIG. 9.

Time Synchronization

In the implementation of synchronous gesture recognition in accordance with the present invention, it must be determined which samples from a local device (for example mobile device 200-1) and remote device (for example mobile device 200-2) are truly "synchronous" in the presence of network delays. Network protocols such as SNTP (Simple Networking Time Protocol) can synchronize the clocks of a large number of widely distributed devices to within a small time delta. These protocols may cause the clock on a computer to jump forward or backward in the interest of synchronizing absolute time across multiple computers, making such protocols difficult to use for determining the relative time deltas between distributed sensor samples.

Synchronous gestures only require knowledge of these time deltas, so that local and remote sensor samples can be ordered in time to determine if two events occurred simultaneously (or nearly so). In one embodiment, the Synchronous Gestures implementing software used in the mobile devices 200-1 and 200-2 determines time synchronization as follows. When the two devices first communicate over network 801, the initiating device (for example 200-1) passes time T1, a millisecond timer since the machine was rebooted (for example using the GetTickCount Windows API call). The other device (for example 200-2) acknowledges this message and replies with its millisecond timer, T2. The first machine then notes T3, the time the acknowledgement was received. The networking delay, NetDelay, is then given by:

NetDelay=(T3−T1)/2

In one embodiment, the software recalculates the networking delay if the result is too large (e.g. due to a momentary dropout). More rounds of communication can also be added to arrive at a more exact average networking delay, but since the synchronization demands of the techniques of the present invention are modest (on the order of 50 ms) further precision may not be necessary. Other methods of calculating the network delay can also be employed.

Once the networking delay is known, the offset, ClockOffset, between the two millisecond timers is given by:

ClockOffset=T2−T1−NetDelay

This ClockOffset is all that is necessary to calculate if two events (time stamped with the local processor's millisecond timer) occurred at the same time. Note that once this ClockOffset is reliably determined, it does not matter if the networking delay changes in the future. The only reason to recalculate the ClockOffset would be to correct for possible long-term drift in the clock rates.

Other time synchronization algorithms can alternatively be used. The Reference Broadcast Synchronization (RBS) algorithm enables synchronization to within less than a millisecond. The RBS algorithm is described, for example, in the paper: Elson, J., Girod, L., Estrin, D., *Fine-Grained Network Time Synchronization using Reference Broadcasts,* Proc. Fifth Symposium on Operating Systems Design and Implementation (OSDI 2002), Boston, Mass. Implementing RBS potentially allows systems of the present invention to more easily reject undesired accelerometer signals that might randomly arrive from separate machines close together in time, but which do not actually occur at the same instant, as with intentional bumping.

Alignment of Time Frames during Gesture Recognition

In exemplary embodiments, the remote device or tablet 200-2 buffers its own sensor samples and, every 100 ms, sends whatever new samples have accumulated to a "server" device 200-1, which performs synchronous gesture recognition. The server buffers several seconds worth of time stamped accelerometer data from remote device(s) and compares it to its own time stamped sensor data (if any). Since reception of remote data may be subject to random network delays and momentary drop-outs in wireless connectivity, gesture recognition occurs by discrete event simulation rather than in real time in exemplary embodiments. From the user's perspective, however, unless there is an abnormally long network drop-out, recognition appears to occur in real time. The system will only miss a synchronous gesture if the drop-out lasts longer than the available buffer space to store local and remote samples.

If the server is hosted on a mobile device 200-1, the local samples from that device not processed immediately. Instead, the server device waits until samples with the same time stamp (adjusted by the ClockOffset) arrive from remote device(s) 200-2. It then uses the time stamps to handle individual samples in order, until there are no more samples of the same age or older than the most recently received remote sample. Using this technique, it can properly measure simultaneity and measure time-outs between various events even though their arrival may be delayed and out of synchrony with the most recent locally obtained samples.

Also note that for recognizing a specific synchronous gesture, such as bumping two devices together, it is possible to recognize half of the gesture on each device independently. For example, each device could recognize when a single (local) spike on the accelerometer occurs. Then, rather than continuously sharing all sensor values, the devices can share and synchronize information only when one or more of the devices observes a spike. This would cut down on the amount of network traffic and reduce power consumption necessary to continuously transmit samples.

Bumping as a Synchronous Gesture

Figure 10:
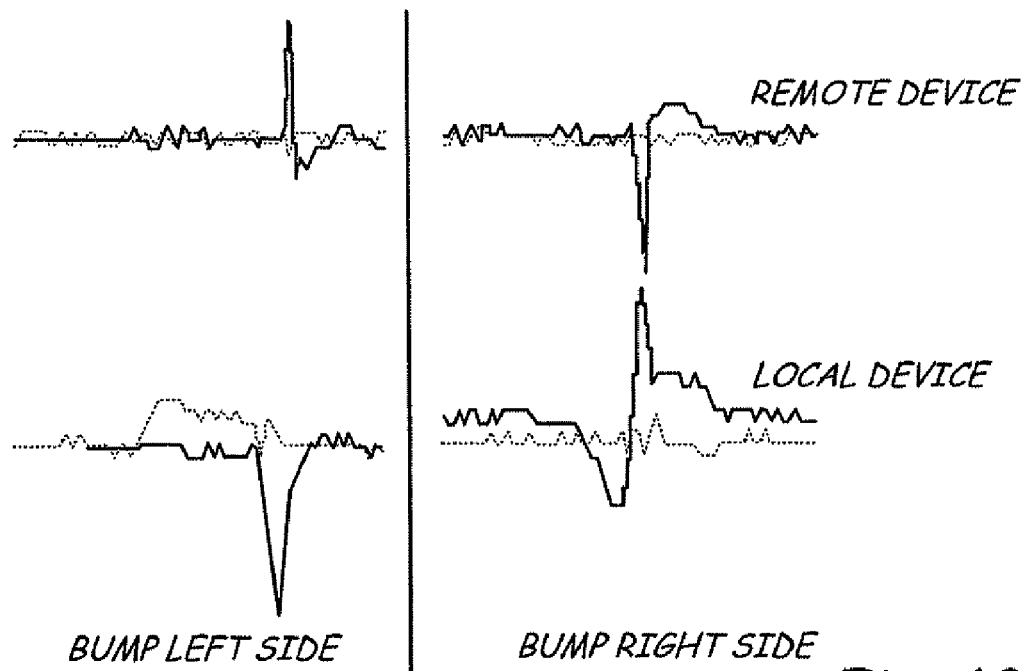
FIGS. 10 and 11 are plots illustrating accelerometer signatures when bumping two tablet computing devices together.

Bumping a pair of mobile devices together generates hard contact forces that the accelerometer of each mobile device can sense. To understand the possibilities for and limitations of interaction techniques based on bumping, it is helpful to see what types of signals are generated, as well as to consider undesired signals that may potentially look like bumping. FIG. 10 shows example data from a user holding one mobile device (the "local device") and bumping it into another mobile device lying on a desk (the "remote device"). Each mobile device experiences a roughly equal but opposite pattern of forces. Note that striking the left side of a mobile device versus striking the right side results in a similar sensor pattern, but with spikes in the opposite direction. This allows the system software to determine which side of each mobile device has made contact. This information is useful for tasks such as jointly displaying portions of a single image, in which the orientation of the mobile devices relative to each other is important.

Because the mobile devices are typically rectangular, bumping an edge of the mobile device will primarily excite only one axis of the accelerometers. The second orthogonal forward-back sensing axis is also plotted in FIG. 10, but it has almost no response to the left-right impacts shown in the figure. Hence, the sensing axis with the largest response to the bump provides the information to distinguish top and bottom bumps from left and right side bumps.

As a practical matter for gesture recognition, the signatures may not always be as clean as those shown in the plots of FIG. 10. For example, if the mobile devices are angled slightly as they bump together, there may be one impact from one corner of a mobile device making contact, followed very quickly by a second impact from the other corner striking the same edge of the mobile device. Or, if a user is a bit over-zealous and bumps the mobile devices together forcefully, there can be a significant bounce back in the opposite direction as well.

Figure 11:
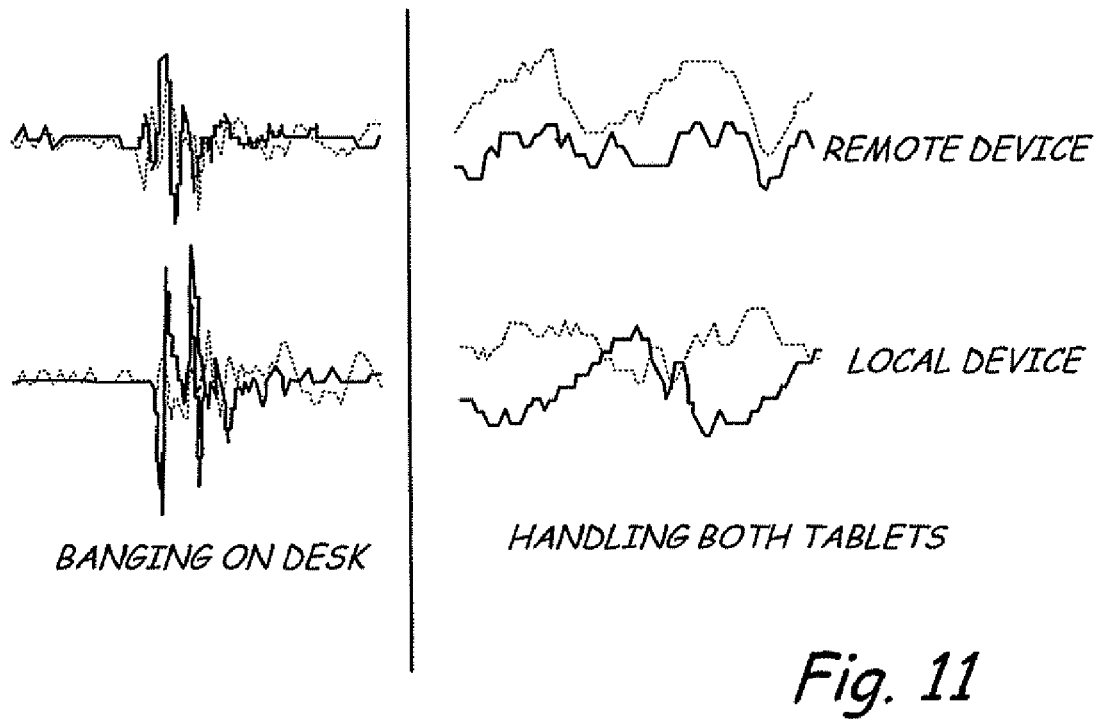

Another set of problems results from "noise" signals that may resemble intentional bumping together of mobile devices (FIG. 11). For example, spikes, peaks, or humps in the accelerometer data can occur if the user bumps into a desk surface that both mobile devices are resting on, or if two users move their mobile devices at the same time. Hence, sensing intentional bumping gestures requires software that can ignore spurious signals by selectively responding only to tightly synchronized spikes on the same sensing axis. In an exemplary embodiment, one criterion the software uses to reject "noise" signals is to ignore any spikes that occur when neither of the pair of mobile devices is being held (as detected by the touch sensors). Further details of a gesture recognition algorithm are provided later.

Dynamic Display Tiling via Docking

Interaction with mobile devices is often constrained by the available screen real estate. Dynamic display tiling is a new interaction technique that enables multiple users (or one user with multiple devices) to combine independent devices to create a temporary larger display. This can be done horizontally (as shown in FIGS. 12-1 through 12-3) or vertically (as shown in FIGS. 13-1 and 13-2). Users can tile mobile devices together by bumping one mobile device 200-1 against another one 200-2 resting on a desk or in a user's lap. Dynamic display tiling offers a promising application area for the synchronous gesture of bumping two devices together. Users can easily break the connection by removing one of the mobile devices.

In some embodiments, for dynamic display tiling, one mobile device 200-2 (the base mobile device) rests flat on a desk surface, and a second mobile device 200-1 (the connecting mobile device) is held by a user and bumped into the base mobile device along one of the four edges of its screen bezel. Note that this creates a hierarchy in the connection. The interaction metaphor is that the connecting mobile device temporarily annexes the screen real estate of the base mobile device; if either mobile device is removed, the base mobile device reverts to its previous state. In one embodiment, the system distinguishes the base mobile device from the connecting mobile device using the touch sensors, since there is no need to hold the mobile device resting flat on the desk. If both mobile devices are being held, in some embodiments the system instead uses bumping to support sharing information between the mobile devices (described later). Also, other connection hierarchies can be employed.

The combined information from the accelerometers allows the system to sense the command (dock the displays 803-1 and 803-2) as well as its parameters: the edge to dock to (left, right, top, bottom) and, in combination with the touch sensors, the direction to dock (using the connecting vs. base mobile device distinction). Hence although bumping is a simple action, it is rich in the syntax of potential operations it can support.

FIGS. 12-1 through 12-3 illustrate the time sequence for "docking" the displays of two devices 200-1 and 200-2 using a synchronous gesture intended to cause the two displays to each generate a portion of a single image. As shown in FIG. 12-1, display 803-1 of mobile device 200-1 is displaying a panoramic image 805 that does not fit the screen well, while display 803-2 of mobile device 200-2 is displaying a document 807. As shown in FIG. 12-2, when the user docks the mobile devices by bumping them together side to side (side 804-1 to side 804-2), the connecting mobile device 200-1 temporarily appropriates the screen real estate of the base mobile device 200-2. Thus, the base mobile device and the connecting mobile device each display a portion (805-1 and 805-2) of the image 805 originally shown only on the connecting mobile device. When the user removes one of the mobile devices, the connection is broken and the base mobile device 200-2 reverts to its previous state as shown in FIG. 12-3.

FIGS. 13-1 and 13-2 illustrate this dynamic display tiling function with the two mobile devices combining to display the image 810 vertically (in portions 810-1 and 810-2) as a result of an end to end bumping gesture between ends 808-1 and 808-2.

If desired, to provide feedback to the user(s) regarding the acknowledgement of the synchronous gesture, when the system recognizes the docking of the mobile devices, the connecting mobile device makes a short metallic clicking sound (or other sounds) suggestive of a connection snapping together. It also displays an arrow pointing to the edge of the screen that the other mobile device will dock to (see FIGS. 12-2, 13-2 and 14-1). It then sends a message to its remote partner telling it to dock along the corresponding edge of its display. When the remote partner receives this message, it makes a different popping (or other) sound to indicate the completion of the connection. It also displays a smaller arrow pointing at the edge that the other display will dock to. The size disparity of the arrows is meant to convey the hierarchy of the connection (connecting mobile device vs. base mobile device). Other mechanisms of conveying the hierarchy can also be employed; for example, we have found that an animated arrow that appears to slide from one screen to the other screen upon connection works well to convey this. After conveying the hierarchy of the connection, the arrows automatically disappear after about two seconds.

Note that it can be useful and important for the remote device to provide its own feedback to let the user(s) know when both devices have agreed to the connection. The feedback often may appear to be simultaneous and redundant, but when there is a brief wireless networking drop-out, the confirming feedback from the other device may appear a second or two later. If it does not appear, the user(s) then know that the connection may have been lost. Audio feedback, in addition to visual feedback, is also likely to be useful. Because the techniques of the present invention can involve more than one user, one user's attention may not be on the mobile devices when docking occurs. Also, if a user is handling a mobile device and a false positive recognition of docking were to occur, it would be important for the user to know about this so that the connection can be broken if desired.

As stated previously the user can break the connection by removing one of the mobile devices. In practice this means each mobile device looks for the connection to be broken by monitoring its local tilt and touch sensor data. If significant movement (sensed by comparing a time-decaying measure of changes to the tilt values to a simple threshold) occurs while the user is holding the mobile device, the local system infers that the mobile device has been moved away. If, however, the user releases the mobile device before motion stops, this indicates that the user may simply be letting go of the mobile device after docking, so the docking state is maintained in this case. Furthermore, in an exemplary embodiment, a one second time-out is used after docking to ensure that the movement required to dock the mobile devices does not trigger an immediate (false positive) recognition of undocking. In other embodiments, removing a mobile device does not break the connection; instead the user must explicitly select a "disconnect" command using a menu, pen gesture, or other common means of issuing a command.

Once a mobile device recognizes undocking or receives an explicit command from the user to undock, it sends a message telling its remote partner to also undock. To provide feedback to the user(s), in an exemplary embodiment the local mobile device immediately plays a short and distinct breaking sound and shows a broken arrow on the screen (See FIG. 14-2). The remote mobile device provides the same feedback when it receives the message telling it to undock.

Applications and Metaphors for Tiling Displays

Figures 1, 15:
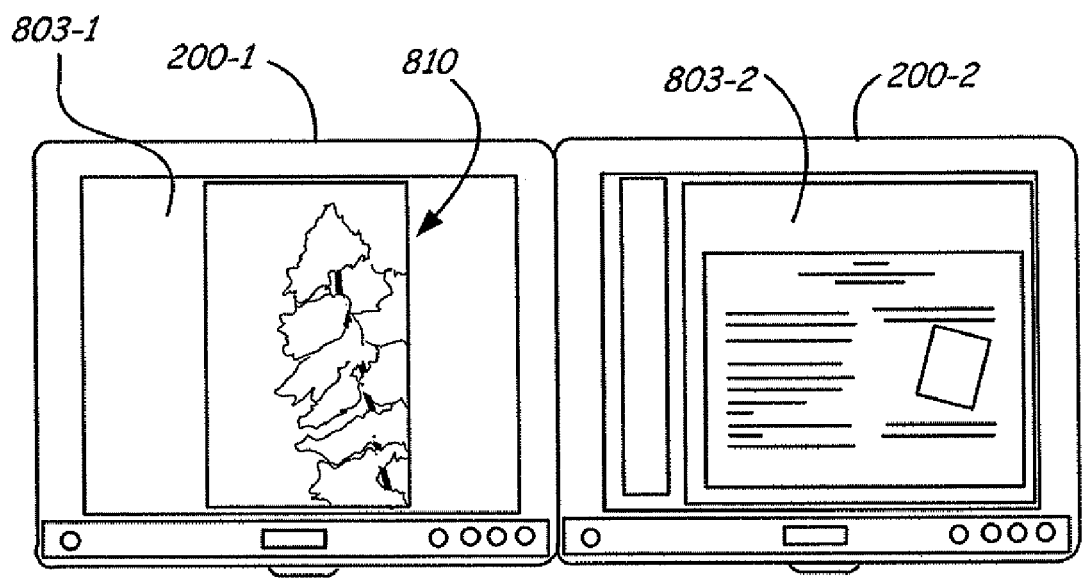
Figures 2, 15:
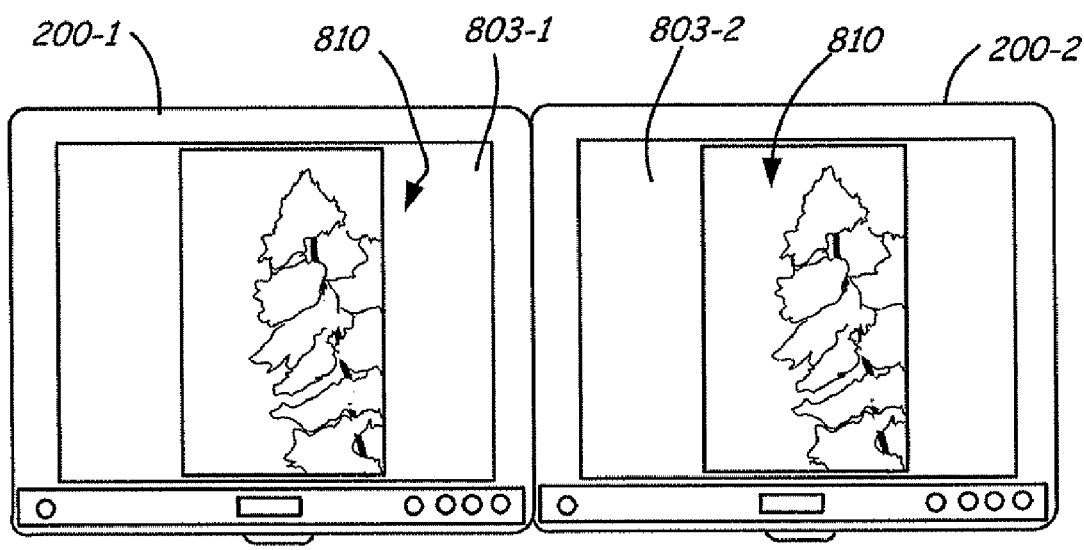

Sharing the displays of two mobile devices via a synchronous gesture can be implemented in a variety of different manners. For example, when docked to a second mobile device, if the aspect ratio of an image displayed by a first mobile device is such that it can take advantage of the display of the second mobile device, the image expands to encompass the other display (covering whatever was previously on the screen there) as was shown in FIGS. 12-2 and 13-2. However, if the image cannot make use of the additional screen real estate (e.g., the user docks another display horizontally to the left, but the image is a vertical-format picture) the same image can shown on the other display for the other user to see more clearly. For example, FIG. 15-1 illustrates mobile devices 200-1 and 200-2 at the beginning of a side-to-side bump synchronous gesture. Display 803-1 of mobile device 200-1 displays image 810 in a vertical format. Display 803-2 of mobile device 200-2 displays a document or other image. Since the orientation of the two mobile devices is horizontal (side-by-side), while the image format is vertical, after the synchronous gesture mobile device 200-2 also displays image 810.

Figure 16:
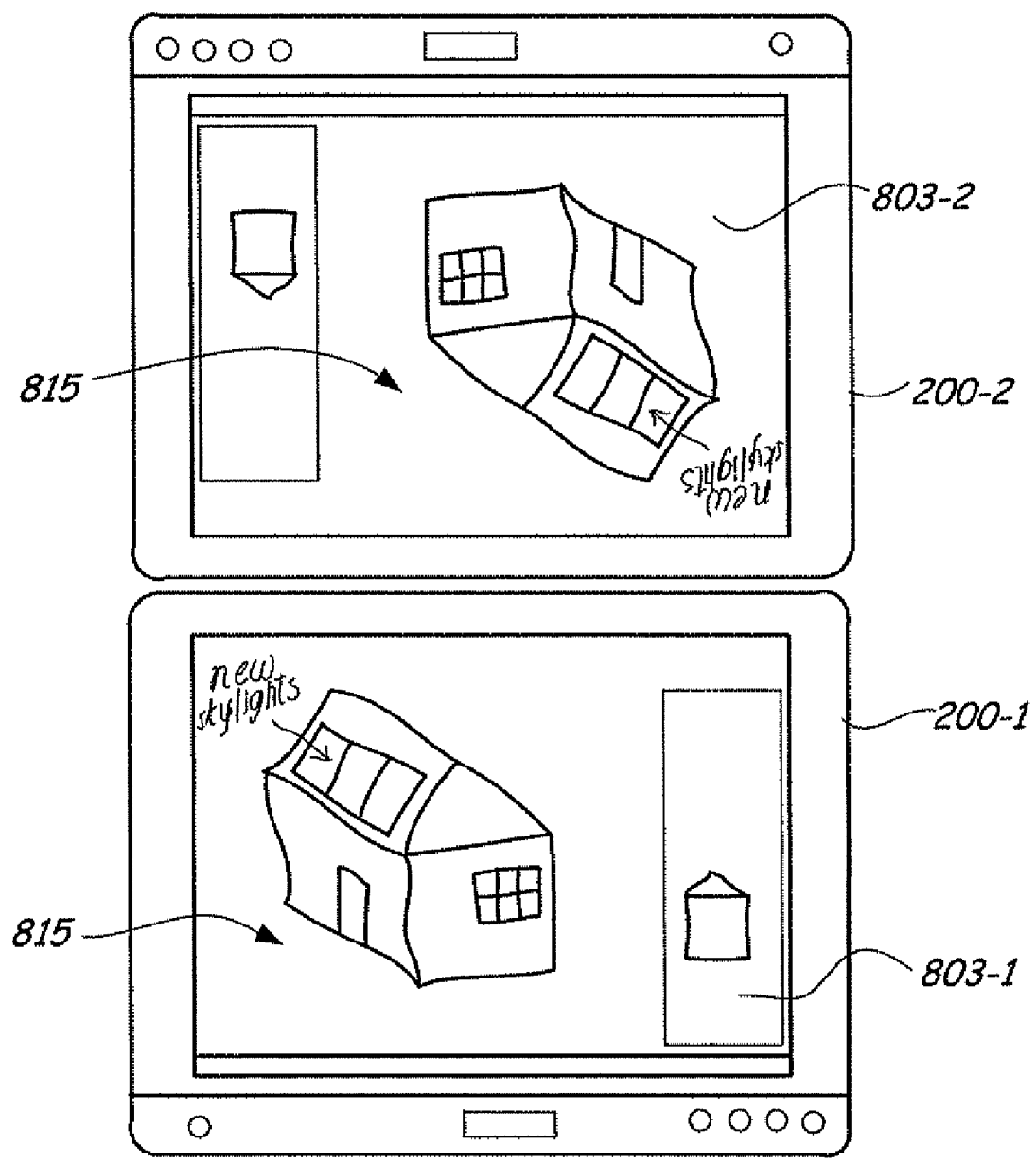
FIG. 16 is diagrammatic illustration of a task jointly executed by two mobile computing devices as a result of a bumping type synchronous gesture.

Another example is illustrated in FIG. 16 in which the devices are configured to display the same image 815 upon the detection of the bumping synchronous gesture. In this example, the bump is between front edges of mobile devices 200-1 and 200-2. The devices are configured to display the image 815 in its original orientation on each device.

As another example, if a document is displayed on the connecting mobile device 200-1, upon docking, the network path name to the document is sent to the base mobile device 200-2. The base mobile device displays the document and scrolls it to show the next page so that between the two mobile devices, two consecutive pages of the document are simultaneously displayed. Other examples of using synchronous gestures to create one large display space, with the connecting mobile device acting as the "boss" that tells the base mobile device what to display, are possible.

Mutual and One-Way Sharing of Information

In some of the above described embodiments, recall that dynamic display tiling uses the touch sensors to detect when one display is not being held, but is just resting on a flat surface. In other embodiments, if both mobile devices are being held the system uses this distinction to execute a different kind of task. In some embodiments, the system 800 uses this distinction to support a couple of techniques for sharing information between devices 200-1 and 200-1. In some embodiments, if two users holding their mobile devices bump them together, the mobile devices perform a mutual equal exchange of information. For example, each device sends its owner's home page address to the other mobile device. The technique supports a digital version of exchanging business cards. When both users bump their mobile devices together, each device passes the user's home page to the other device and brings up that page in a web browser. Upon recognizing the synchronous gesture, the system makes a brief sound suggestive of teleporting information to the other device. Visual feedback can also be used, for example two arrows of the same size (since there is no hierarchy to the connection).

A variation of this technique allows one-way sharing of information suitable for copy/paste operations. A user can "pour" information from his mobile device into another user's mobile device by tilting his mobile device up when bumping with the other user's mobile device. If the mobile device is tilted more than 15 degrees relative to the other mobile device when the users bump mobile devices, the software sends clipboard information to the other device. For audio feedback, the mobile device receiving the clipboard data can make the sound of water dripping in a pool to suggest the pouring metaphor.

In the above description of some embodiments of the invention, touch sensor(s) are used to determine which device(s) are being held. In another embodiment, the system uses the signature of the accelerometer itself to infer which device is striking, and which device is being struck. The accelerometer registers a small signal as one device is accelerated towards the other device. By comparing the accelerometer data from each device, it is possible to determine which device was moving prior to the impact, and which device was still (or if both devices were moving).

Synchronous Bumping Recognition Algorithm

In some embodiments of the present invention, the system software employs a deterministic algorithm to recognize synchronous spikes in the accelerometer data from a pair of devices 200-1 and 200-2. Given natural variations in user performance, the algorithm requires some flexibility to reliably sense when the user intentionally brings two mobile devices together, but the algorithm cannot be too flexible or else other naturally occurring patterns (shaking, handling, or putting down devices) may be interpreted as "bumping."

The algorithm operates by keeping track, for each sensing axis on each local-remote pair of devices, of whether or not the signal is currently above a running average by more than a fixed threshold (10.0 degrees) or below the running average by the same threshold. The running average for each accelerometer axis on each device is computed as ⅛ of the current sample plus ⅞ of the previous running average. Every time the signal passes through these thresholds, it generates a transition. These transitions are then used to gradually fill out the following data structure as local and remote samples are handled in sequence.

```
typedef struct {
    bool rising_edge; // edge passed thresh?
    double rise_peak_t; // time of peak magnitude
    float peak_mag; // peak magnitude
    bool found_one_spike; // seen a spike?
    double spike_found_t; // time spike found
    float sync_bump_mag; // magnitude of sync bump
} BumpInfo;
```

BumpInfo Transitions [2] [2] [2];

The transitions array of BumpInfo structures creates one instance of the data structure for each of 8 cases: spikes on the local or remote device, on the left-right or forward-back axis, and above or below the running average.

Once a signal transitions past the running average threshold, the rising_edge flag is set true and the peak_mag (peak magnitude of a spike after crossing the threshold) and rise_peak_t (time stamp of the peak magnitude) are initialized using the current sample. If subsequent samples rise further beyond the threshold, then these members are both updated.

If a peak above the running average is wider than the 62.5 ms timeout TOUT_TOO_LONG, it is ignored. These timeouts are given symbolic names to illustrate that these are just exemplary values, not necessarily representing optimal values, which do not limit the scope of the invention. In this example, by ignoring peaks above the running average wider than the timeout TOUT_TOO_LONG, the algorithm is restricted to look for narrow, sharp spikes typical of impact forces. Otherwise, as soon as the peak drops back below the running average, the found_one_spike flag is set true and the time that this spike was recognized is stored by setting spike_found_t to the time stamp of the current sample. At this point, the code checks the BumpInfo structure to see if a spike on the other mobile device has been recorded. If so it calculates the synchronicity of the spikes by subtracting the respective spike_found_t members. If the synchronization of the spikes falls within a 50 ms window TOUT_MAX_SYNC, the spike is recorded as a candidate for a true "synchronous bump" with sync_bump_mag set to the peak_mag of this spike.

Once a candidate for a synchronous bump is identified, the algorithm continues to look at additional samples for the following 200 ms timeout TOUT_CHOOSE_BEST_SYNC. If a candidate with a larger peak magnitude is found, it replaces the previous candidate. This behavior allows the algorithm to seek out the most significant spike, rather than taking the first one which exceeds the threshold. If it did not wait to seek further candidates, the algorithm would face a race condition where the first sample over threshold always "wins" even if other spikes are more representative of the actual gesture made by the user. This is a real concern because there may be some excitation of the orthogonal axis of the accelerometer. If this happens to exceed the running average threshold, it may lead the software to incorrectly determine which edge of the mobile device the user bumped into; waiting for the best candidate in a small time window allows most such errors to be avoided.

In exemplary embodiments, the algorithm introduces a couple of other criteria to weed out false positives for synchronous bumps that may be the result of handling two mobile devices at the same time. If both sensing axes of the accelerometer observe large peaks, this suggests the contact force is not primarily along any one axis, so it is ignored. If a large number of candidates are observed, this indicates a repeated vibratory signal, and is also ignored. With an actual "synchronous bump" typically only 3-4 viable peaks will be observed. Bumps are also ignored if neither device is being held (touched) by a user. Finally, to avoid responding to accidental double-strikes, once a synchronous bump is recognized, all further bumps are ignored for TOUT_IGNORE_AFTER_SYNC=750 ms.

Another implementation detail involves choosing when to re-initialize the data structures. In some embodiments, the array of BumpInfo structures and the list of synchronous bump candidates are completely cleared out whenever a synchronous bump is recognized as the best candidate within the TOUT_CHOOSE_BEST_SYNC time window, or if no synchronous bump is detected, whenever TOUT_INITIALIZE=1000 ms have passed since the last observed transition.

Once a synchronous bump has been identified, the edges of the mobile devices involved in the collision (for example mobile devices 200-1 and 200-2) can be identified using the table of FIG. 17. The table of FIG. 17 maps observed synchronous spikes, above or below the running average threshold, for each device and accelerometer sensing axis. Here, the "Device" column refers to either the connecting device held by the user, or the base device resting on a desk (struck by the held device). "Direction" refers to the direction of the spike with the highest magnitude above or below the running average threshold.

Limitations

The proposed recognition algorithm and system hardware can be adapted to address limitations which may be discovered for a particular implementation. For example, when intentionally bumping mobile devices together, the system's most common potential failure is to recognize the correct axis of the bump, but to get the direction wrong. This can occur if significant positive and negative spikes both result from the impact. Since the algorithm does not respond to the first spike, but only to the spike with the greatest magnitude within a small time window, if the "bounce back" from the impact has a greater magnitude than the initial impact itself, this problem will occur. Although it will likely occur infrequently, it may be necessary to increase the sampling rate of the hardware to completely eliminate this problem. Since the algorithm is based on simple crossings of a running-average threshold, it is potentially susceptible to recognition of "spikes" in signals that are not truly representative of bumping a pair of mobile devices together. One simple way to eliminate many false-positives is to keep timeout windows such as TOUT_TOO_LONG and TOUT_MAX_SYNC as narrow as possible, yet still wide enough to admit variations in user performance, and to accommodate errors in the ClockOffset computed for time synchronization. To this end, precise time synchronization algorithms can allow timeouts such as TOUT_MAX_SYNC to be very tight, on the order of 1-10 ms.

Scope of Synchronous Partners

With a large number of devices, looking for synchrony could overload limited wireless network or mobile device CPU resources, and also increase the possibility of false positive recognition of "synchrony" through pure chance. If a set of n devices attempts to synchronize with every other device, then there are $n^2$ one-way connections to consider. In practice, each pair of devices only needs to compute synchrony once, so $n(n-1)/2$ possible synchronies exist. Computing synchrony seems feasible for on the order of 10 devices, but may be computationally prohibitive or subject to increasing rates of false positive recognition if hundreds or thousands of devices must be considered.

Some way to restrict the scope of potential partners for synchrony would be useful for a large-scale implementation of synchronous gestures. Allowing users to explicitly select a set of connected devices to form a "synchronous gesture group" is one solution. Automatic techniques for restricting the scope of potential synchronies are also possible, and could be as simple as limiting communication to other mobile devices on the same subnet. For example, scope restriction techniques using the set of wireless devices visible to the wireless network access point with the highest signal strength could be employed. This could be further refined through location triangulation using signal strengths, thus limiting searches for synchronous gestures to other proximal devices. A possible difficulty comes from uncertainty in this data, e.g., two co-located devices might fail to search for synchrony due to error in location estimates.

Another strategy used in some embodiments utilizes the concept of a proximity server. In these embodiments, each wireless device registers its own signal strengths with a Proximity Server that is found via service discovery/service lookup. The proximity server can then reply by giving that device a list of machine names (or internet IP addresses) of all devices with similar signal strengths. In this way, a device can discover all nearby devices and communicate with them to establish synchrony.

A final strategy is to rely on peer-to-peer networking. Although current 802.11 cards have some difficulty working in peer-to-peer mode and infrastructure (access point communication) model simultaneously, card designs which overcome this limitation are possible. Devices communicating in peer-to-peer mode using wireless technology can simply broadcast their synchrony data, and any device that is within range to receive that data can reply with its own local synchrony data. In this way, devices can establish synchronous gesture connections with any other devices within range of the local device's wireless transmitter.

Synchronous Bumping vs. Location/Proximity Sensing

As discussed above, in some implementations, synchronous gestures may depend on some form of scoping or proximity detection as a technology to restrict the number of devices which must be considered. If proximity or location sensing is used in support of synchronous gestures, then one could question why synchronicity should be computed at all? It certainly would be possible to connect two devices if they are proximal to one another. However, if a multitude of devices exists in the same proximity, how does a user specify which devices to connect to, and how does the system know the spatial relationship between them? Synchronous gestures provides an answer to these questions.

Merely having two devices near one another does not necessarily indicate that the users have any desire or intention to share information. What bumping via synchronous gestures offers on top of proximity detection is an explicit step of intentionality that the user has control over. Bumping removes the need for the user to select a device from a list of several devices (as required by proximal selection). With the synchronous gesture of bumping two mobile devices together, the selection is done in the physical world by manipulating the actual objects of concern. It also provides additional information: with proximity, it is not clear which edge of a mobile device should be docked, nor is there any hierarchy in the connection. Finally, the technology enables support for actions other than display tiling, such as sharing or pasting information between mobile devices. It would be difficult to support all of these behaviors using proximity alone without burdening the user with additional decisions and selection actions.

Additional Synchronous Gestures

The embodiments described above implement synchronous gestures based on bumping objects together, with several interaction techniques based on variations of this gesture. A number of other possibilities for synchronous gestures exist. For example:

Synchronous Gestures Based on Human-human Communication and Body Language.

In human-human interaction, there are many examples of familiar, naturally occurring synchronous or sequenced behaviors in body language and interpersonal communication. These naturally occurring gestures could be sensed and used as implicit contextual cues to augment human-human or human-computer interaction. Examples include shaking hands, two persons bowing to one another, people turning to face one another, and so on. Such interpersonal behaviors suggest points of departure for analogous but artificial synchronous gestures to facilitate human-computer interaction. Sensors which are designed to sense these kinds of cues can be employed to detect a synchronous gesture in other embodiments.

Synchronous Gestures from Commonly Available Devices.

Although the above-described embodiments primarily discuss synchrony between mobile devices augmented with sensors, synchronicity using ordinary input devices can also be exploited. For example, two users can press and release buttons at the same time to connect their devices, or mice from two different computers can be brought together until they collide, with the system software looking for simultaneous cessation of movement on both mice. Such actions might be useful to simulate synchronous bumping gesture on systems without any special sensors, or to support new techniques. Other synchronous gesture embodiments called stitching, which use pen input on mobile devices, are discussed below.

Synchronous gestures implemented in the current system include dynamic display tiling, sharing information by bumping together mutually held mobile devices, or pasting information from one mobile device to another by angling one mobile device down while making contact. Although described with reference to real-time recognition strategies, if sufficient memory exists to store all samples, synchrony can even be determined in the absence of constant wireless connectivity by detecting synchrony at a later time when both devices become connected to the network again. When bumping two mobile devices together to share information, for example, delayed recognition of synchrony might be useful to users who want to protect their privacy and explicitly give the OK to pass the information at a later time.

Bumping is also applicable to multiple PDA's, or cell phones, tablets, pagers, and other mobile devices. Furthermore, it is also possible to recognize bumping between dissimilar devices such as a tablet and a PDA. Also, the present invention isn't limited to synchronous gestures between two devices. For example, three or more devices can be tiled together using synchronous gestures.

Stitching Synchronous Gestures: Pen Gestures that Span Multiple Displays

In yet other embodiments, unique synchronous gestures are established for pen-based tablet computers and/or handheld devices that can sense contact from a stylus. With wireless networking, multiple mobile devices become a large input area that can track and coordinate the movement of a single pen across the multiple mobile devices. This is referred to as stitching. For example, stitching allows a user to make a stroke with one pen (i.e., stylus 710 shown in FIG. 6) near the screen of a mobile device computer, across the screen bezel, and onto the screen of another mobile device. Such a gesture can be used to infer the spatial relationship between the two screens, and can be used as a gesture to connect the devices.

While several previous systems foster collaboration between ubiquitous devices, they may require special hardware such as overhead cameras or unique ID tags on each device, or they may require manual entry of network addresses and the geometry of displays. Stitching can be used as a new interaction metaphor that uses commonplace pen input capabilities to establish and manage serendipitous connections between pen-operated mobile devices. As described above, a stitching gesture consists of a continuous pen motion that starts on one mobile device, continues past the bezel of the screen, and ends on the screen of another device, as shown in FIG. 18-1 in which the path 852 of the pen motion is illustrated between devices 200-1 and 200-2. Such gestures serve as the basis for a flexible architecture that allows users to dynamically bind together mobile devices. Stitching can be implemented on a variety of pen-operated devices, does not conflict with existing uses for the pen, and provides a versatile framework that can accommodate future extensions.

From the user's perspective stitching seems like a single cognitive chunk, but the gesture actually specifies a number of properties of the connection:

It selects which devices participate in the connection.

One can phrase together selection of operands (e.g., a file to copy) and commands (how to combine the devices) with the stitching gesture itself.

By fitting a line to the pen coordinates as they leave one device and enter another, one can calculate the approximate spatial relationship between the two devices. This allows placement of graphics or providing feedback that appears to span the displays. See FIG. 18-1 for example.

We describe a prototype photo sharing application for the Tablet PC that supports operations such as copying images from one tablet to another that is nearby, establishing a persistent shared workspace for collaboration, expanding an image across multiple screens, or using one tablet to display a slideshow of images that a user selects from another tablet. Usability testing suggests that users readily grasp stitching, and find it compelling to have a straightforward means to perform cross-device operations. We also observed that sociological issues of co-located collaboration raise several design issues. We found it is important to support a range of device configurations, from intimate combinations of devices in direct contact, with one another, to sharing information while maintaining social distance. The latter requires support of stitching between devices that are nearby one another, but not touching.

The Requirements of Stitching

In exemplary embodiments, a stitch is defined as a gesture, spanning two or more devices, which establishes a communication infrastructure or otherwise combines the resources of multiple computers. In order to provide a flexible and potentially extensible facility that can support a number of different ways of combining devices, stitching addresses the following central design questions:

1. How is a connection established? A user must name the devices that are involved in a multi-machine operation, and the system needs to provide feedback to the user(s) of those devices that a connection has been established.
2. What type of connection is required? The user needs to be able to choose among several possible ways to combine the devices. Does the user want to copy a file from one device to another? Establish a persistent shared workspace for collaboration? Expand an image across multiple screens? These all represent multi-device commands that transcend the barriers between devices.
3. What information is shared? Multi-device commands may require operands, such as which file to copy to another computer. Users need mechanisms to select one or more objects as part of a stitching gesture.
4. How do users share physical space? Proxemics suggests that the arrangement of spaces can influence communication; as Hall writes, "what is desirable is flexibility . . . so that there is a variety of spaces, and people can be involved or not, as the occasion and mood demand". Hall, E. T., *The Hidden Dimension*, p. 110 (New York: Doubleday, 1996). Interaction techniques that form impromptu associations between mobile devices should likewise support the range from users who know each other well and want to work closely together, to users who are strangers and want to exchange files while keeping their distance.
5. What is the spatial relationship between the devices? Several previous systems support features, such as combining the screens of two devices, that require knowledge of where one display is relative to another. Stitching uses the information provided by the pen to infer the spatial relationship between devices. This also allows graphical feedback to be provided for multi-device operations that appears to span devices, as seen in FIG. 18-1.
6. How do stitching gestures coexist with traditional pen interactions? Stitching gestures must coexist with existing uses for the pen including widget interactions, inking, character entry, and naturally occurring human-human communicative gestures (such as waving the pen near the device while discussing the contents of the screen).

The Mechanics of Stitching

The above design questions suggest that stitching represents a new class of interaction techniques that could be implemented in a variety of ways. In portions of this application, the general concept of stitching is discussed in reference to a proof-of-concept photo sharing application called Stitch-Master, which represents an example embodiment of the invention. With digital photography becoming widespread, sharing photos with others is a task of interest to many persons. Also, many of the semantics that we wanted to explore with stitching, such as expanding an image across multiple screens or copying objects from one screen to another, represent useful and compelling operations for digital photographs. To begin, each user launches StitchMaster on his own tablet, which displays that user's photo collection as a set of thumbnail images.

1. Establishing a Connection

Stitching requires devices that can sense the same pen; the user names the devices to connect by moving the pen across them. Since there is a natural order implied by the gesture, stitching also establishes which machine is the sender of information, and which machine is the receiver. Some connection techniques are inherently bidirectional and do not naturally provide this information.

Each participating device sends its pen events to a stitching server, which may be hosted on a machine in the environment to offload computation from the mobile devices. The stitching server synchronizes time between the devices and looks for matching pen traces; when a match is found, the server sends a stitching event that informs the two devices of each other's network address. Each participating device must know the network address of the server, but this is the only address needed to bootstrap the system. This address may instead be found via service lookup mechanisms, or by using wireless signal strengths to locate a nearby server.

Stitching Recognition

The stitching server recognizes a stitch by looking at the patterns of pen activity from each pair of participating devices. We define an envelope as the time interval during which the pen is in range of the screen and is moving at a speed above a predetermined threshold. The stitching server then looks for two consecutive envelopes from a pair of devices that match a specific pattern:

The first envelope must end near the first screen's border and last longer than dTmin1 (250 milliseconds).

The second envelope must start near the second screen's border, and last longer than dTmin2 (=100 ms).

The second envelope must start after the first envelope, but it may occur no longer than dTmax (=3.0 s) after the first envelope. This time interval is sufficiently long to support stitching between tablets that are within arm's reach (a maximum of about 75 cm).

It has been found that these criteria suffice to recognize intentionally executed stitching gestures, but just as importantly, false positives were not a problem: incidental pen motions from two users concurrently using pens on their mobile devices rarely satisfy these criteria.

User Feedback for Stitching

In one embodiment a stitch is recognized as soon as the first 100 milliseconds of the second envelope have been observed by the stitching server; it does not wait for the user to finish the motion. Performing this eager recognition allows the system to provide users with feedback of the stitching gesture as soon as possible after the user has entered the second screen.

In one embodiment, feedback for a successful stitch consists of a short chirp sound as soon as eager recognition takes place. If the stitching gesture includes any operands, then the system shows a semi-transparent blue shadow on the screen in the shape of the selected photos (FIG. 18-2(*a*)). Upon completion of the stitching gesture, the system may also provide additional feedback. For example, for a copy or move operation, StitchMaster shows an animated semitransparent cone that appears to whisk files from one machine to the other (FIG. 18-1). This provides clear feedback of where the files came from, and where they were copied to (FIG. 18-2(*b*)).

2. Specifying Connection Type: Multi-Device Commands

Multi-device commands supported by StitchMaster include copying or moving photographs, establishing a persistent shared work space, expanding an image across multiple displays, or entering a presentation mode known as the gallery (described below). StitchMaster presents these options in a pie menu. There are two basic design choices for where the command selection can occur:

Local menus: Users choose the command (e.g. Copy) on their local screen, and then stitch to indicate the remote device that is involved.

Remote menus: Users stitch to another device, and then a menu appears on the remote device providing options for how to combine the devices.

StitchMaster implements remote menus, which allows the visibility of multi-device operations to be limited to situations where they are known to be applicable; thus the single-device user experience is not complicated with options for multi-device operations. Remote menus appear at the end of a stitching gesture when the user holds the pen still for 0.5 seconds. To provide feedback that a menu is a remote menu, StitchMaster shows a transparent blue cone that connects the remote menu back to the display where the stitching gesture originated (FIG. 18-3).

For some stitching gestures, StitchMaster assigns a default operation, eliminating the need to use the menus. For example, when stitching with a selected photo (that is, stitching using an operand as described in the next section), by default the selected photograph is moved to the other screen.

Example Multi-Device Command: The Gallery

The Gallery (FIG. 18-4) allows one user to give a presentation of selected photos to another user. To start the Gallery, the presenter selects an image to start with, stitches to the other screen, and chooses Gallery from the remote menu. The other tablet then displays a full-screen view of the selected image, while the presenter's tablet displays thumbnails of all of his photos. The presenter can click on any thumbnail to change the image that is displayed on the other tablet.

The Gallery changes the roles of the devices. Instead of two identical devices, we now have one tablet for interaction, while the other primarily serves as a display. If users separate the devices, but keep the Gallery running, the presenter's tablet becomes a private view, while the other tablet represents a public view of selected information.

3. Specifying What to Share: Stitching with Operands

StitchMaster supports tapping on a single photo to select it, or drawing a lasso to select multiple photos. StitchMaster outlines the selected photos in orange and scales them to be slightly larger than the others (FIG. 18-5). Users can select a photo and then perform a stitching gesture to another device all in one gestural phrase. The user makes a selection, and then lifts the pen slightly so that the pen is no longer in contact with the screen, but is still within tracking range of the Tablet PC screen. The user then stitches to the other display, and the selection is treated as the operand of the stitching gesture.

Phrasing works well, but we observed that users sometimes become focused on the selection step, and momentarily forget about stitching. Therefore, we do not require that stitching follow selection in a single uninterrupted gestural phrase. A stitching gesture that starts over a selection also includes that object as an operand, but after 3 seconds, the selection cools and will no longer be treated as the operand for a stitching gesture. The highlights around selected photos turn blue once the selection has cooled. This approach prevents old, stale selections from mistakenly being interpreted as the operand to a stitching gesture.

4. Sharing Physical Space

With varying social and cultural conventions, individual preferences, and changing needs depending on the task, users need flexible ways to share physical space when combining devices. Hall distinguishes two distances within arm's reach, intimate and personal, with social and public distances beyond that. StitchMaster includes support for intimate, personal, and social distances.

Intimate spaces support tight collaboration between friends or colleagues who may need to work together on a large document. For example, StitchMaster supports placing two tablets together and then expanding an image to fill both screens. The displays act as tiles of the same virtual space. This style is also well suited for a single user wishing to extend his workspace with additional devices.

Personal spaces. Users can stitch together tablets that are separated by up to about 75 cm. This allows a space created by stitching to act as a whole, yet each user maintains his or her own personal space. For example, StitchMaster allows users to create a persistent shared workspace by making a "simple stitch" from one screen to another without any operands. A vignette that appears to surround the two screens turns red to give users ongoing feedback that the two machines are connected. Either user has veto power over the connection and can close the workspace by choosing Disconnect from a menu.

Social spaces. Once users join a shared workspace, they can further separate their devices, yet still work together. For example, a user can employ the transporter to give photos to the other user, even if that user is no longer within arm's reach. The user drags a photo to the edge of the screen, and dwells with the pen. After a brief pause, during which an animation of a collapsing blue square is displayed, the photo is transported to the other device. This pause is necessary to separate transporting a photo from normal drag operations; the collapsing blue square gives the user feedback that the picture is about be transported.

Orientation of spaces. In an example embodiment, StitchMaster only supports stitching between tablets that are at the same physical orientation, so users must sit shoulder-to-shoulder. However, research suggests that communication patterns change when persons sit face-to-face, shoulder-to-shoulder, or at 90 degree angles to one another. Stitching can be extended to support pen gestures that span tablets in any of these orientations if desired.

5. Calculating the Spatial Relationship between Devices

To infer the spatial relationship between devices, stitching fits a line equation to the coordinates traversed by the pen on each screen. Of course, users do not move the pen in perfectly straight lines, but users do tend to move in arcs that can be locally approximated by a straight line.

When the stitching server detects a stitch from Device1 to Device2 (i.e., devices 200-1 to 200-2), it records a small window of samples as the pen leaves one screen and enters another, yielding p0 (the exit point of the first pen trace), p10 (the entry point for the second pen trace), p11 (the point at which the stitch was recognized), and α0 (the angle of motion at p0); see FIG. 18-6.

Due to the sampling rate of the pen, the first and last pen locations reported by the tablet may fall up to 3-4 cm from the edge of the screen. It was found that calculating the width of the screen bezel or the extent of any empty space between the devices by using the time interval between the last and first observed samples may lead to inaccurate distance estimates. For this reason, in one embodiment, the device's bezel thickness is initialized as a fixed constant, and then any empty space that may be present between the devices is ignored.

The intersection of the stitching gesture is estimated with the edge of each screen, yielding the points PA and p1. PA is the intersection of the screen edge of Device1 with the line that passes through p0 at an angle α0; p1 is the intersection of the second screen edge with line that passes through p10 and p11 at angle α1. If the line between PA and p1 has angle α, the offset between the two screens is then tan(α) times the bezel width. We estimate α as the average of α0 and α1, which seems to work well, even if the user follows an arcing path while stitching. We then calculate PB as the displacement of p1 along the edge of Device2's screen by offset pixels.

Using this approach, exemplary embodiments of the systems of the invention can transform points from one device's coordinate system to the other, thus allowing the presentation of graphics that appear to span the devices.

6. Coexistence of Stitching with Traditional Interactions

Stitching must allow users to establish connections between devices without interfering with existing uses for the pen. Input states supported by pens include tracking (moving the pen in close proximity to the screen, causing the tracking symbol to move), dragging (moving the pen in contact with the screen, causing an action such as dragging an object or leaving an ink trail), and out-of-range (the pen is not in the physical tracking range of the screen).

Stitching can be implemented using the dragging state, or using the tracking state. StitchMaster implements options to use either style of stitching, or both can be supported simultaneously (this is the default).

Stitching in the Dragging State

Since traditional graphical user interface (GUI) interactions occur in the dragging state, performing stitching by dragging could conflict with them. For example, when stitching via dragging, the first device cannot be sure whether to interpret a pen stroke as a drag until the second device recognizes the completion of the stitching gesture. To circumvent this problem and allow stitching via dragging to coexist with other dragging operations, speculative execution is used: StitchMaster initially assumes all pen strokes are intended as drags. If the stitching server then reports a stitch, StitchMaster undoes the drag and instead treats the gesture as part of a stitch.

During preliminary user testing, it was found that users can easily make a stroke while keeping the pen in contact with the screen, but when stitching to another display, the screen bezel gets in the way. This makes it hard for users to make a quick, fluid pen motion across the bezel while bearing down on the pen. Instead, users must drag the pen to the edge of the first screen, lift the pen to jump the screen bezel, and then complete the stitching gesture by pushing the pen back into contact with the second device's screen.

Stitching in the Tracking State

Stitching from the pen's Tracking state represents a more advanced skill than dragging, as it requires moving the pen while keeping the tip within 2 cm of the screen surface to prevent it from entering the out-of-range state. However, stitching by moving the pen just above the surface of the screen (with the base of the hand resting on the screen) allows the user to make a continuous, quick, and fluid movement that is not interrupted by the physical "speed bump" of the screen bezel. Another advantage of stitching in the tracking state is that it avoids the need for a speculative execution scheme: stitching gestures occupy a separate layer that rests on top of GUI interactions.

The main drawback of implementing stitching in the tracking state is that currently available personal digital assistants (PDA's) do not support tracking, so future extensions of stitching to PDA's would have to use the dragging state. Another potential problem is that users may use the pen to gesture while talking about the contents of the screen with a colleague, potentially resulting in a false-positive recognition of a stitching gesture. The stitching recognition techniques of the present invention are designed with this issue in mind, so false positives are rare, but no recognition scheme is foolproof.

The Proxemics of Co-located Collaboration

Usability testing resulted in two primary "lessons learned" in relation to proxemics:

Do Not Require Contact. Testing sessions begun by instructing users to "put your tablets together" were attempted. Although many users followed these directions, some users seemed hesitant to place their tablet in direct contact with that of the other user. In 3 of the 7 sessions, participants placed their tablets together, but asked "Do they have to be right next to one another?" When the experimenter replied that they did not, subjects moved them approximately 15 to 40 cm apart. Clearly, stitching must support gestures between tablets that are not immediately adjacent to one another. Fortunately, this had been anticipated in the design, so stitching worked well for these participants.

However, this does not mean that intimate spaces, with the devices close to or in contact with one another, are not useful. It depends on the users and what they are trying to accomplish. When asked at the end of the study if "Combing the screens of multiple Tablet PCs was a compelling capability," the average response was 6.8 (agree) out of 7. Users commented that they liked "the ability to split the view, so there are no two faces trying to peek at only one screen" and that the "wide screen would be nice for collaboration, like for two people working on the same spreadsheet." Thus, although participants worked with a stranger during the study, they seemed to envision other contexts where close, joint work would be valuable.

Establish and relax. Users want to establish a connection via stitching, but then relax the increasing social tension by quickly exiting the personal space of the other user. In the study, when one user reached over with the stylus, the other user would often lean back to make the intrusion into personal space less acute. Many subjects made short stitching gestures that only extended 3-5 cm onto the other user's screen, and some users held the pen near the top, like a pointing stick, rather than holding it at its tip, like a writing instrument. Users' may have adopted these behaviors in an effort to minimize intrusions into the other user's personal space. Similarly, the transporter, which allows users to share files without repeatedly reaching into the other user's personal space, was popular with test users.Alternative Hardware for Stitching One of the strengths of stitching is that it leverages widely available pen-operated mobile devices, but nonetheless future hardware enhancements can offer additional embodiments over current implementations of stitching.

Unique ID. Stitching works well without a unique ID on the pen, but if pen ID's become widely available, the ID could be used to boost the certainty that two separately observed pen traces represent a single pen gesture performed by one user. Whether or not a pen ID is available, recognizing the requirements for a versatile interaction paradigm for combining multiple mobile devices, and providing these via the aspects of stitching outlined in this paper, are key contributions of our work.

Tracking beyond the screen boundary. It was found that it is difficult for users to start a stitch from the extreme edges of the screen. If the tablet could continue to sense the pen location 1-2 cm beyond the edge of the screen, it is possible to eliminate this problem.

Standardized Pens. The pen of one mobile device may not necessarily work on that of another manufacturer. If pens become standardized, they could work on any device. Alternatively, if all pen computers included touchscreens, users could use their fingers to make stitching gestures.

Multiple Pens. In one embodiment of a system of the invention, users cannot perform a stitching gesture to a tablet while the other user is already using a pen on that tablet, because current Tablet PC's can sense only one pen at a time. Systems which overcome this limitation can be implemented if Tablet PC's are designed to sense more than one pen at a time.

Multi-Device Stitching

In one embodiment, the stitching system architecture has been extended to support formation of sets of up to 16 devices, but StitchMaster currently only supports formation of pairs of tablets. The stitching server adds a device to a connected set if the user stitches between a connected device and a new, disconnected device. Extension to even more devices can be achieved.

Stitching with Other Types of Devices

PDA's. Currently available PDA's cannot sense the tracking state. Since stitching can use the dragging state, it is possible to support stitching on PDA's. Including PDA's in the system of the invention allows interesting new applications. For example, two designs are considered that use PDA's to alter the proxemics of stitching (FIG. 18-7). Porches 1000 use PDA's 1010 as public areas for receiving visitors; each tablet 200-1, 200-2 has its own porch. To give a file to someone else, a user moves it onto the other user's "porch" via stitching, or to offer a file for taking the user leaves it on his own porch. The other user can then take the file from a public porch into the more closely held main screen area. This reduces the need for each user to violate the personal space of the other user. The candy dish 1050 places a single PDA 1010 in the no-man's-land between two other devices 200-1 and 200-2. Each user may then place files into the PDA via stitching, or take files that have been left there by the other user. Again, the users would not have to reach into each other's personal space to share files.

Large Displays. It is possible to support stitching from small devices onto a large-format pen-operated display. Because of the size disparity, the small device may occlude part of the large display, and stitching gestures may leave the edge of a small device but enter the large display almost anywhere. Since some current recognition algorithms look for stitches that cross the edges of the screens, recognition policies have to be adapted. To avoid false-positives, it might become necessary to use a pen with a unique ID capability or to consider further features of the pen motion, including:

The direction of travel or the curvature of the arc that the pen makes as it exits one screen and enters another.
The velocity of the pen.
The pen tilt angles (azimuth and elevation).

Alternatively, one could avoid recognition by requiring the user to explicitly signal stitching gestures. For example, the user could select a menu command such as Stitch to Another Device . . . before starting a stitch, or the user could hold down the barrel button on the pen while stitching.

Further Stitching Discussion

It is also possible to look for specific patterns of simultaneous pen activity from separate users on separate mobile device screens. For example, two users on opposite sides of a room can engage in simultaneous scribbling by making sweeping circular motions with their pens at the same time. This can "drill through" to the other user, bringing up a shared workspace.

One particular challenge with this class of interaction techniques is to differentiate these intentional gestures from incidental patterns of activity that might result from user's pointing at each other's mobile devices, or performing simultaneous but independent pen movements. Systems in some embodiments of the present invention use the dynamics of the pen gesture (that is, properties calculated from individual time-stamped pen coordinate data, including but not limited to pen velocity, curvature, direction of travel, and limited time-outs between exiting one screen and entering another nearby screen). In some embodiments it is also required that the pen traverse particular regions of the screen, e.g. the outermost 20% of the screen, both when exiting one mobile device and when entering another. In this way only continuous gestures intended to perform "stitching" will be recognized as such, but incidental pointing movements that may occur incident to verbal discussion will not have unintended consequences.

Figures 1, 19:
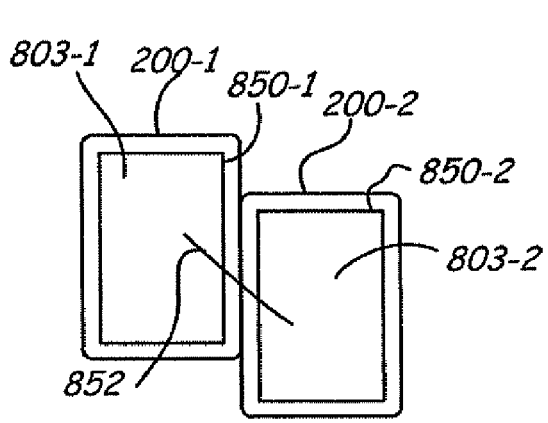
Figures 2, 19:
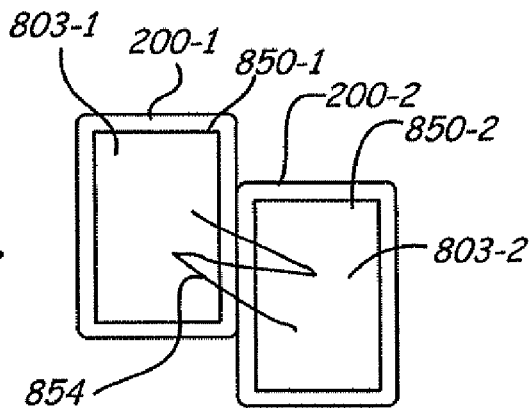
Figures 3, 19:
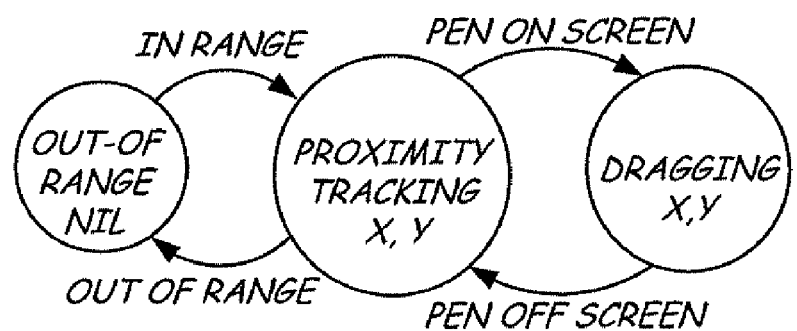

Stitching involves continuous movement of the stylus or pen 710 from the display screen 803-1 of one mobile device 200-1, across the screen bezel 850-1, and onto the screen 803-2 of another mobile device 200-2 as shown in FIG. 19-1. In FIG. 19-1, this movement is represented by line segment 852. In FIG. 19-2, this movement is represented by line segments 854.

Note that although the mobile devices are shown as touching in this figure, it is not necessary that they be in actual physical contact. Supporting stitching between mobile devices that are not physically touching is very important for social reasons. In many cultures, unwelcome touching immediately raises feelings of apprehension, mistrust, withdrawal, or other negative consequences. This applies to one's own body as well as to totems—personal objects or possessions that act as a proxy for one's self. Hence being forced to place one's mobile device right next to another user's device, and leave it in contact, may not be acceptable in some cultures, between some users, or in some situations.

In one embodiment the mobile devices may be separated anywhere from 0.0 to 1.0 meters and still respond to stitching gestures. The user also may configure this parameter to change the distance that is allowed. This distance also may vary by direction; for example, users seated next to one another will desire greater separation, but users seated face-to-face across a table have the physical barrier of the table between them, and may be more willing to put the tops of their mobile devices in close proximity. Note that the system does not measure distance, but only approximates it using a time-out. For example, a time out of a few seconds allows the user to move the pen to any other screen within arm's reach.

Finally, in other embodiments it is possible that the displays physically overlap or occlude one another, such as when a small display is used on a large pen-sensitive wall display or pen-sensitive tabletop display. In this case, the user may stitch from the small display to the large display (or vice versa) without having to be "next to it"; the user can instead be completely or partially "on top of it".

The simple linear segment stylus movement 852 illustrated in FIG. 19-1 is quick and easy to perform. The more complex form of stitching represented by line segments 854 in FIG. 19-2, and other complex forms of stitching, can be used to imply different semantics (commands) for connecting devices.

The software looks for the resulting pattern by time-synchronizing samples from each mobile device. Stitching takes advantage of proximity tracking, which is the ability of mobile devices to track the position of the pen when it is merely proximal to (not touching) the screen, as shown in the three-state model of FIG. 19-3. All Tablet PC's support proximity tracking (but note that current PDA devices do not). Stitching operates in the proximity tracking state, whereas inking, gesturing, or pen interaction with traditional GUI widgets occurs in the dragging state. The main reason it is proposed that stitching be implemented in the proximity tracking state, as opposed to the dragging state, is to avoid user confusion with or accidental activation of traditional GUI widgets, inking, or gesture input. However, in some embodiments, the system does allow stitching while in the dragging state, or in a combination of the dragging state and the proximity tracking state. For example, the user may hover above a tablet PC, and then bring the pen into contact with the screen and continue dragging on a Pocket PC (which cannot sense proximity tracking). This enables stitching between dissimilar devices. In some embodiments, users may choose an option that allows them to perform stitching in the proximity state, in the dragging state, or in either state (including combinations of the two).

While stitching is quick and simple to do, it provides quite a bit of information:
  It selects which devices participate in the connection.
  It specifies the spatial relationship between the devices. Is the connecting device left, right, above, or below?
  It specifies a direction to the connection. The gesture starts on one screen and ends on the other, so it naturally indicates a hierarchy or direction of flow for information.
  It provides enough information to determine the alignment between the screens. Are the screens exactly aligned? Is there a translational offset? Perhaps some rotation if the bezels are not snugly placed together? Knowledge of this alignment can be used to accurately place graphics that span the screens, or the offset might intentionally become part of the manipulation vocabulary (i.e. forming a large shared screen vs. forming a split-screen when the tablets are offset from one another). Note that the alignment can be calculated using the geometry of the pen gesture itself. In some embodiments, the system can also calculate the distance between the screens by using the pen velocity and the measured time-out between the pen exiting one screen, and entering another nearby screen. In other embodiments, the dimension of the screen bezel is read from the system registry, and any additional space between the screens is treated as if it were not there.

Stitching with Marking, Glyphs, or Suggestions

Figures 1, 20:
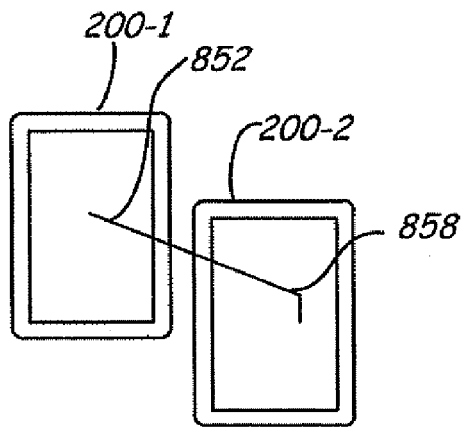
Figures 2, 20:
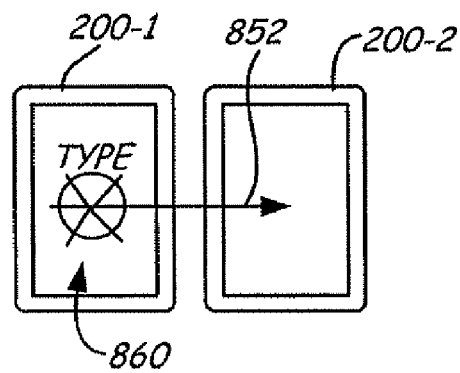

To extend the sets of actions that stitching can support, it is valuable to integrate a selection mechanism such as marking. There are several possibilities:
  Marking: Integrate marking or another menuing mechanism with stitching. This can be achieved by making the stitch in the proximity tracking state, then dwelling (hovering) with the pen. The user can also complete the mark without hovering as shown in FIG. 20-1. The marking menu appears after a time-out. This has the nice property that the user can stitch and mark in the hover state as a single flowing gesture (stylus movements represented by stitch line segment 852 and mark line segment 858) if they are already familiar with the menu. This places the command portion at the end. In other embodiments, the command portion can be placed first as shown in FIG. 20-2 which includes the selecting stylus action (for example circling, etc) represented at 860 followed by the stitch line segment 852.
  Glyphs & Gestures: Distinguish multiple types of stitching actions by turning the stitch into a more complex gesture or a movement that includes glyphs. FIG. 18-2 shows one example, and FIGS. 21-1 and 21-2 show others. FIG. 22-1 shows yet another which is used in one embodiment to implement the "Copy" task. A glyph can appear at both ends of the stitch (see FIG. 21-1), just at the beginning (see FIG. 22-1), or just at the end. These and other examples of glyphs and different stitching gestures are used to distinguish multiple types of stitching operations (e.g. tile displays, establish shared whiteboard, instant messaging, etc.).
  Suggestions: The user makes a stitching gesture, and then several alternative suggestions of what the stitch means are displayed. The user picks one to complete the action.
  Eraser Stitching: Users can also make the stitch gesture with the eraser end of the pen. This can be defined to a different meaning. It could also be used to explicitly "erase" a connection if desired. However, an action on a single screen, such as erasing the icon that represents the connection to the other tablet, would often work just as well and would typically be easier to do.

Stitching with Operands

It is possible to stitch together displays with an operand, such as a selected file that is to be copied from one mobile device to the other. This allows the implementation of "Pick and Drop" without a unique ID feature on the pen. An example of a conventional "Pick and Drop" implementation is described in the article: Rekimoto, J., *Pick-and-Drop: A Direct Manipulation Technique for Multiple Computer Environments*, Proc. ACM UIST '97 Symp. on User Interface Software & Technology, 1997, 31-39. Selection could simply fall back on traditional selection mechanism, but there is a problem. If a stitch uses the currently selected object as an operand, then any time the user happens to leave an object selected, it will not be possible to do a simple stitch without an operand. One solution is to implement a short time-out after the selection; if the stitch does not occur shortly after the selection, then it is not treated as an operand.

Another solution is to integrate object selection tightly with the stitching gesture itself. For example, selection can be a loop gesture or glyph while proximity tracking that surrounds the object being copied. This is then followed by a simple linear stitch gesture to the other display. This is illustrated in FIG. 22-1. Alternatively, the gesture can start by pressing the pen to the screen to create a selection rectangle, or to draw a lasso around objects to select as shown in FIG. 22-2, then lifting the pen and making a linear stitch in proximity onto the other display. Finally, crossing over an object with a stitch is another option. This option could result in increased errors when stitching occurs in the tracking state.

Using a drag rectangle or lasso gesture allows selection of multiple objects. For example, a complex path circling (and thereby selecting for copying) multiple objects prior to the stitch movement to the other screen is shown in FIG. 23. The result would be the copying of these objects from device 200-1 to device 200-2.

Tasks and Metaphors Supported by Stitching or Bumping

Techniques such as bumping and stitching allow the formation of dynamic associations between co-located mobile devices. These dynamic associations allow new ways of combining multiple computers, and raise many new applications metaphors and can support a number of operations. In one embodiment, the metaphor (i.e. how to combine the devices) is selected explicitly by the user using a menu or other interface control. This menu may be done via marking, and thus integrated with a stitching gesture, or it may be a separate step that the user takes after bumping (or stitching) to connect to another device.

Application metaphors and tasks to support include, but are not limited to:

- Bringing up an instant message or chat session between multiple devices
- Collaboration with shared whiteboards or annotation: users can see what others are sketching and contribute ideas
- Establish groups of users or group behaviors
- Set up a scratchpad surrounded by source content (content/tool palette metaphor)
- Take a piece of a display with you
- Setting up a split screen view with another user
- Migrating applications to another mobile device, or setting up a "rooms" environment (virtual desktop)
- Establishing video conferencing between multiple users
- Multiple viewports that look into a large virtual workspace and/or support navigation in such a space
- Copying, moving, or sharing files (as discussed in the previous section). Lending files is also possible; in this case, copied or moved files are only accessible on the other user's system for a fixed time, and then they expire. By default, they are available for 5 minutes. Users may use a menu to choose other time spans for lending objects.
- Presentation mode: One mobile device is configured as a controller, and one or more other mobile devices are configured as viewers. For example, on the controller mobile device, one user can display thumbnails of photographs or powerpoint slides. When the user taps on a slide, all other users see only that slide. The controller mobile device may also show other private information such as subsequent slides, notes, annotations, etc. that are not visible to other users.
- Book mode. Each mobile device enters a reader mode, and displays subsequent pages of a document. If the mobile devices are connected along their hinged edge, the user may tilt up the mobile device (or the lid of the mobile device) to flip through the book.
- Remote desktop. The user may stitch and select the remote desktop (or remote assistance) options. This allows one user to see a mirror copy of the other user's screen and access all buttons, menus, etc. Optionally this applies only to a single window or document, rather than the user's entire desktop.
- UI Extension. For example, a user might stitch from a watch with a touch-sensitive screen to a PDA or Tablet Computer. The larger device could then display configuration options and interface controls that might normally be inaccessible or awkward to use given the very limited interface controls and minimal screen real estate available on a watch.

Some of these areas are discussed in more detail below.

Multiple Viewports

Multiple viewports support viewing another chunk of a map or a blueprint. Examples in the literature include Chameleon and Peephole displays. Here, additional tablets show the appropriate section of a large image, if we interpret the second tablet as enlarging the view of the first tablet (e.g. peephole interaction with a second peephole). The Dynamic Display Tiling technique essentially follows this metaphor.

Content/Tool Palette Metaphor

Figure 24:
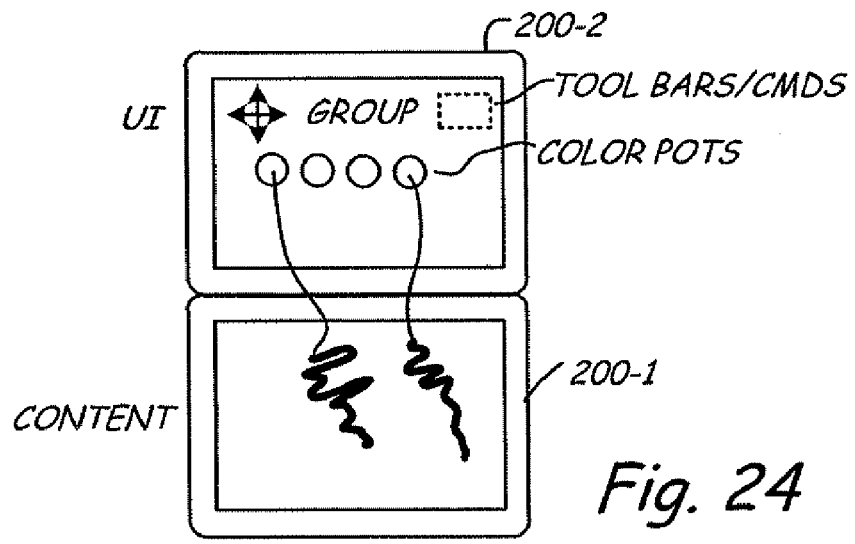

An interesting metaphor is to have a stitching gesture (or marking menu) that supports configuring one mobile device as the "content" and a second mobile device as the "tool palette" with tool bars, commands, "color pots" for painting, etc. This is illustrated in FIG. 24 in which mobile device 200-1 is configured to display "content" and mobile device 200-2 is configured to display the tool palette (tool bars, commands, etc.). The advantage is that one mobile device fully becomes the content, with no screen clutter to get in the way of viewing the document or image. The disadvantage is that making a round-trip to the tool palette now involves moving a longer distance (off-screen to a physically separate mobile device).

One variant of this is using a mobile device as a tool palette in combination with a large display. This involves stitching between a mobile device or other device and separate display device (for example a vertically oriented display)

Scratchpad/Content Metaphor

Figure 25:
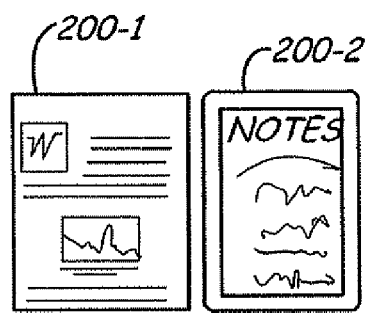

Using this stitching metaphor, one mobile device serves as a scratchpad for taking notes, while surrounding mobile devices display documents or other content, and are mainly read-only devices. Thus, the user reads a document on one mobile device (for example mobile device 200-1 shown in FIG. 25) and takes notes on another (for example, mobile device 200-2 shown in FIG. 25). A stitching gesture could allow users to easily achieve this configuration.

Selecting a Portion of Another Screen/Split Screen

Figures 1, 26:
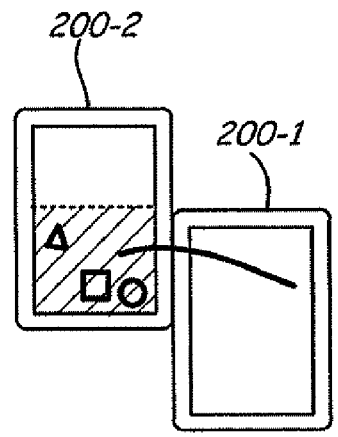
Figures 2, 26:
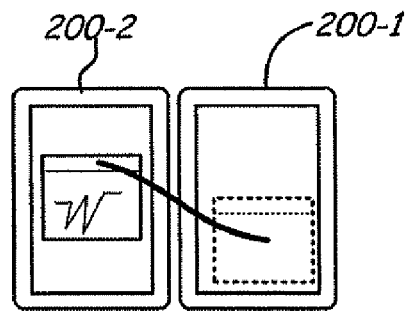
FIG. 2 is a front view of the mobile device of FIG. 2.

By intentionally offsetting the pair of mobile devices, one mobile device indicate a region of the screen on another mobile device. The metaphor is that the user then grabs that portion of the screen and can take it with them. This is illustrated in FIG. 26-1 in which a stitching motion results in the "grabbing" of a portion of the screen real estate of device 200-2 for use in conjunction with the screen real estate of device 200-1. Alternatively the same gesture might indicate a desire to set up a "split screen" on each mobile device, where each user sees "Tablet A" in one half of the screen, and "Tablet B" in the other half. This kind of feature is ideal for collaboration; each user can have his own private area, plus a public shared area that is shared (via the wireless network) with the other device.

Application Migration/Rooms

Application migration, or configuration of another mobile device as a "Room" used in support of primary tasks on the first mobile device, can be achieved by making a stitch that starts over the title bar of a window. Multi-mobile device rooms show additional documents related to a task whenever another display is available. This can be set up on a per-user basis, so that every time two users dock their mobile devices together, documents that they are collaborating on appear.

Photo Application

A compelling application area for stitching is photo viewing and sharing applications. A photo application is particularly well suited for stitching type synchronous gestures because many of the types of semantics discussed above (sharing a large image across multiple displays, copying objects from one screen to another, or annotating pictures in a shared whiteboard application) all represent useful operations on digital images.

Screen Registration

Stitching synchronous gestures provide sufficient information to determine the spatial relationship between the two mobile devices. The bezel width can be stored in the registry of each device or calculated. The offset between screens can also be calculated; that is, if the edges of the mobile devices do not line up exactly, the system of the present invention can calculate the coordinate transformation necessary to translate an x,y coordinate on one screen into the reference frame of another screen. The geometry can be inferred by fitting a linear line segment to the pen coordinates observed by each mobile device. In some embodiments, a higher-order polynomial or curve can be fit to the user's movements instead. In some cases, this may provide slightly better screen registration, as users tend to move in arcs when moving across long distances.

Offsets can also be used for different interaction semantics or to show the correct portion of a large virtual workspace.

Similar screen registration issues have been addressed for multi-monitor systems. However, one important issue differs for pen input on mobile devices. With pen input, the user has to physically traverse the space occupied with the screen bezel. With the mouse, this is impossible unless the user has already configured the system to know where the other monitor is. That is, with stitching, the pen movement itself automatically provides all the information that is necessary for the computer to calculate this transformation on the user's behalf. No explicit calibration or screen registration step is necessary. This makes screen registration far more convenient and practical for mobile devices, which are constantly moving, as opposed to desktop multi-monitor systems, which are typically set up once and never (or rarely) moved.

Interactive Feedback

Some means to provide feedback both during a stitch and after a stitch is recognized is useful. It is possible to do "eager" recognition on gestures that look like stitches to provide some feedback even as the user starts the gesture. This risks distracting the user with false-positive feedback for other motions. If the user is intending a stitch, the user's attention may already be focused on the other mobile device, so such early feedback (prior to leaving the first mobile device) may not be necessary or helpful.

Figures 1, 27:
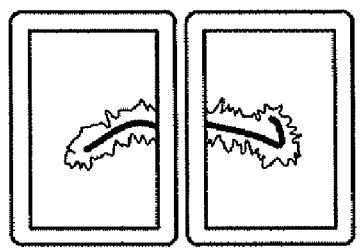
Figures 2, 27:
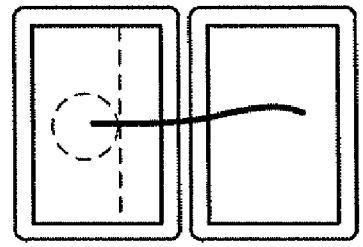

Shortly after the stroke enters the second mobile device, it is possible to recognize the stitch with high confidence and provide early feedback that confirms the action so far and possibly even suggests completions for the action. In some embodiments the sensor history is used to get the pen data and visualize the stitch as a "kite tail" or "smoke trail" as it is being recognized or shortly after recognition completes (see emphasizing details surrounding the stitch in FIG. 27-1). In some embodiments, zones or areas of the screen are defined that stitching gestures must traverse to ensure that sufficient data exists (on both local and remote machines) to recognize the gesture reliably. The feedback can include indications of these zones as is shown in FIG. 27-2 by the circular and vertical dashed lines. Of course, once a stitch is recognized and the system acts upon it, the user has salient feedback of some or all of the screen(s) changing to suit the combination of displays.

The system also may display a shadow as the pen enters the second screen. This shadow indicates the object(s) (operands) of the stitching command. This shadow feedback is particularly useful when copying one or more files (images, icons, windows, etc) from one screen to another.

Additional feedback that is valuable at the completion of the command is to show a translucent cone that connects the final result (i.e. a dropped file) back to the origin of the command on the other screen. For example, the user will see an animated cone that shows a file being whisked from one mobile device, and onto the screen of another, mirroring the physical gesture they just completed. By using this automatic screen registration feature, it is easy to provide such feedback that appears to span the bezel between two separate displays. Another example where such feedback is important is for "remote menus." Remote menus are menus that the user may invoke at the end of a stitch gesture. Typically remote menus are used to select the type of the stitch (e.g. Copy, Move, Lend, Presentation Mode, Expand Image, etc.). In some embodiments, it has been found useful to draw a cone that connects the remote menu back to the object(s) on the original screen where the user's stitching gesture started. This makes it clear to the user that the menu refers to the object on the other screen (and not some object that may appear on the screen that the user has stitched over to).

Connections

Lifespan

Connections can be persistent, persistent but "fragile" (that is, semi-persistent), or transient. An example persistent connection occurs in a shared whiteboard application, where the devices are connected, but can then be moved apart. A transient connection occurs when moving or copying a file from one screen to another: the connection only exists for long enough to copy the data to the other machine, and then is closed. An example of a semi-persistent connection occurs during dynamic tiling with the accelerometer; moving a mobile device away breaks the connection. Stitching could support any of these options.

Feedback for Connections

We can start by having simple icons or feedback of the user's gesture that is associated with the stitch, as is done for bumping with synchronous gestures.

For persistent connections, one metaphor that has been found to be useful is that of a picture frame. Each mobile device starts with a picture frame displayed around the edge of its screen. When two devices are connected, the picture frame is changed such that it appears to encompass both devices, with a gap in the frame along the connected edge(s) of the devices.

For multiple persistent connections another embodiment has a tab at the edge of the screen for each connected computer. The user can then drag objects to this tab to copy information to the other computer once a connection has been established; this is known as the transporter. The transporter is very useful because it allows users to form a connection via stitching, but then move the devices apart yet still easily share objects by dragging them to the tab. The user can also click on the tab or dwell over the tab to "pull down a window shade" that shows the other user's computer. The user could then interact with the other user's computer (and the other user would see the cursor moving about, etc.). If the users move around relative to one another, one user could drag the tab along the edge of the screen to keep it consistent with the (new) relative location of that user.

Figures 1, 28:
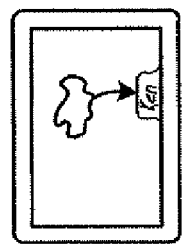
Figures 2, 28:
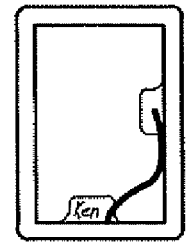

FIGS. 28-1 and 28-2 illustrate tabs at the edge of the screen which represent current connections. These serve as proxies for the other mobile device, even if that user moves out of immediate proximity. FIG. 28-1 illustrates dragging an object to a tab to copy it to the other person's machine. FIG. 28-2 illustrates that users can drag tabs around the edge of the screen. This allows a user to rearrange the tabs if the other user moves around during a meeting, for example.

Accepting or Refusing a Connection

Figure 29:
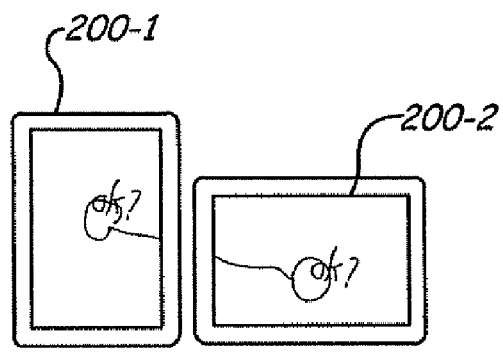

In some embodiments, users are given the option to approve of a connection before it is completed. However, in some embodiments this is not necessary due to the social conventions of people working together; making a stitching gesture onto someone's mobile device will require entry into their personal space, so by social convention one must have permission to do this. However, technological approaches can augment social conventions, for example by requiring simultaneous confirmation from both users. This is illustrated in FIG. 29 where users of each display device are prompted as to whether it is "OK" to make the connection. To accept, both users press and hold "OK" at the same time.

Closing Connections

For stitching, an explicit gesture is typically employed to break the connection. In alternative embodiments, location sensing or a pedometer (that is, using a linear accelerometer to count steps and hence determine that a user has walked away) can be used to break the connection if users leave the proximity of one another. Also note that both users have veto power over a connection; either user can opt to disconnect at any time. In some embodiments, some users may not be given veto power (e.g. for security reasons, to ensure that they get vital information, etc.) but we see this as the exception.

Multi-Device Stitching and Bumping

Both Stitching and Bumping can be extended to connecting more than two devices. For example, a connection technique can be implemented using multiple pairwise stitches or pairwise bumping. Other connection techniques can also be employed. One design property is that it should be easy to add or remove individual devices as users come and go. Multiple pairwise stitches naturally support this.

For some of the glyph-type gestures (e.g., FIG. 18-2), it may be hard for the user to mentally rotate them to occur in the vertical direction. A simple linear stitch does not have this problem.

Figure 30:
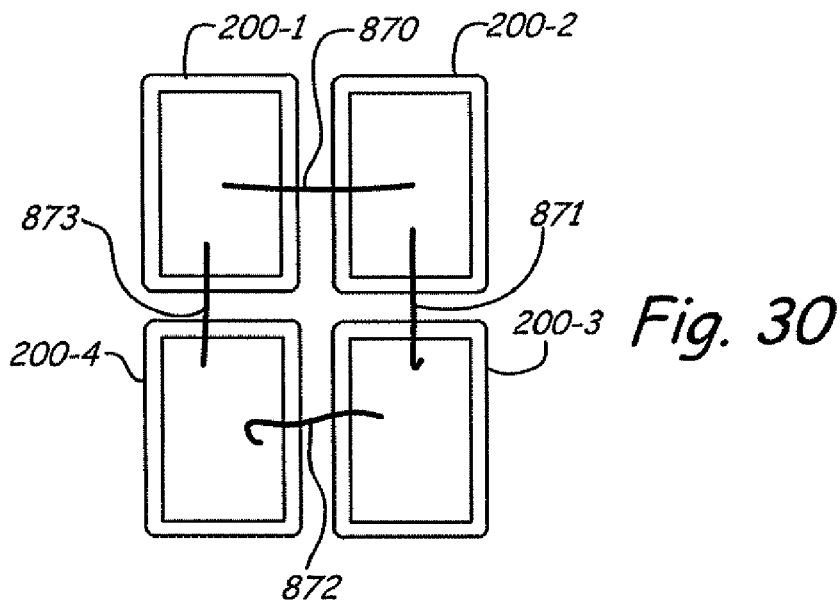
Figure 31:
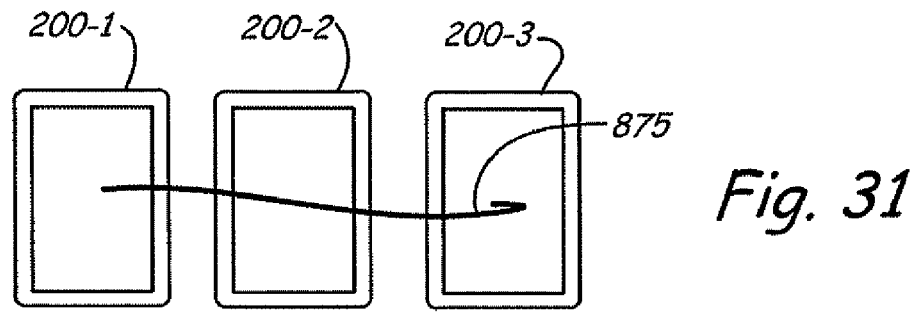
Figure 32:
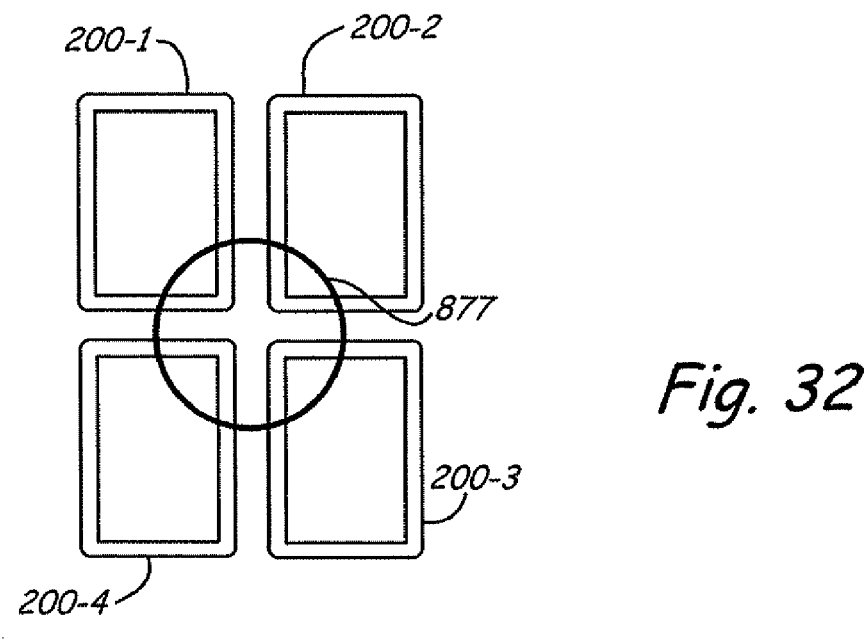

In FIG. 30, four tablets or mobile devices 200-1 through 200-4 are shown stitched together with individual stitches 870-873 between pairs. Here, the final "stitch" 873 back to the first mobile device 200-1 is inferred from the structure. In FIG. 31, three mobile devices 200-1 through 200-3 are stitched together with a single long stitch 875. In FIG. 32, four mobile devices 200-1 through 200-4 are stitched together using a circle stitch or gesture 877.

With bumping, a row of several devices may all sense a "bump" signal from a single new device added onto the end of the row, since the force is transmitted through the devices. This can be used to connect together all devices in a single gesture. If the devices are connected in pairs, this signal has to be filtered to figure out which device the new device actually struck. This can be achieved by considering the topology of already-connected devices when a new device joins.

Stitch Recognition

Various algorithms and techniques can be used in stitch recognition. For example, the algorithms can use "time-outs" between the pen leaving proximity on one screen and entering proximity on another. Also, the direction and velocity of pen motion can be sensed. In other embodiments, the tilt angle of the pen could be sensed to increase robustness and content. If a unique pen ID is available, this can also be used; but unlike Pick and Drop, systems of some embodiments of the present invention use the pen ID in combination with the time-stamped pen coordinates to calculate direction, velocity, etc. to help ensure that the user's motion represents an intentional gesture intended to connect two computers, rather than a simple pointing movement that may happen to occur as the result of talking to another user while pointing at the screen with the pen.

In some embodiments, a Kalman filter predicts the second half of a trajectory from the observed data in the first half of a trajectory. If the second half of a gesture matches that predicted by the Kalman filter, it increases the confidence of the recognition.

Synchronized Scribbling

Figure 33:
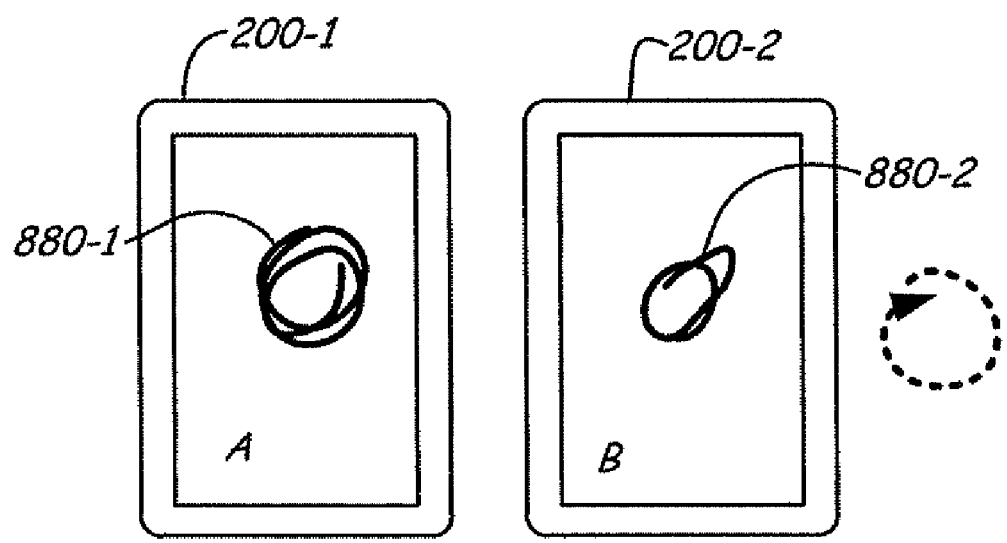
FIGS. 33 and 34 are diagrammatic illustrations of scribbling type synchronous gestures.

In some embodiments of the invention, users can simultaneously make a repetitive pattern on their screens with their pens. Users that make substantially similar motions at the same time become connected with one another. For example, several users that continuously draw circles would "drill through" the screen to the other remote user, fostering a connection. This is a simple way to spontaneously create ad-hoc, transient groups within a number of co-located users. It is also useful in that each user must indicate that they want to belong to the group (rather than having one user create the group, and automatically pulling all named users into the group, or having each user accept/refuse the grouping) by making the repetitive pattern on their screen. This is illustrated, for example, in FIG. 33 in which devices 200-1 and 200-2 are shown stitched using the repetitive stitching patterns 880-1 and 880-2.

Figure 34:
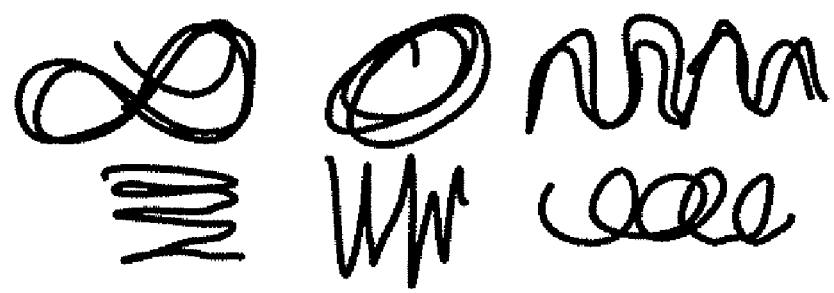

Useful synchronous scribbles seem to require some repeating sinusoidal pattern of motion. Some examples of possible scribbles appear in FIG. 34. Different scribbles can have different semantics for the type of connection implied. Repeating patterns have the nice property that an initiating user can continue doing it until others have a chance to mimic him or her and join the group.

Scribbling is a particularly useful metaphor when the users are co-located but not necessarily in extremely close proximity (i.e. within arm's length stitching or pick-and-drop is appropriate, beyond arm's length scribbling provides a means for forming a connection). Scribbling lacks many of the parameters of connection afforded by stitching or synchronous bumping.

Mechanics: Proximity Tracking vs. On-screen Gestures

Moving the pen or stylus from one mobile device to another while the pen remains in contact with the screen may not always be practical because moving past the edge of the screen strikes the bezel, and pushes the pen up out of contact with the screen. Forcing the pen back down into contact on another mobile device PC requires a deliberate movement. This may be awkward for the user to remember to do in some instances.

Furthermore, in most direct manipulation and pen-based gesture input or marking-based interfaces, making contact with the screen indicates user intent to interact with the content on the screen, or leave an ink trace on the screen. Hence, a gesture that spans multiple screens, with the pen in contact with the screen, may make inter-mobile device gestures hard for the user to distinguish from other existing interaction metaphors. They may also be harder for the software to distinguish from intentional pointing or dragging motions.

By contrast, by moving the pen just above the surface of the screen, the user can make a continuous, quick, and fluid movement that is tracked by one mobile device until the pen moves over the bezel, and then picked up by the other mobile device once the pen has reached proximity to the other screen. This allows the speed and trajectory of the movement to remain relatively constant, allowing us to sense that the movement components sensed by the two (or more) distributed mobile devices are part of a unitary movement by the user.

However, in some embodiments it can be advantageous to allow stitching in the dragging state, particularly when the devices involved cannot sense the proximity tracking state of the pen. Also, it has been found that some users prefer to stitch together two screens by dragging. In this case, if an alternative local interpretation of a dragging gesture may be possible (such as inking on the screen), then the system has several options:

Leave the ink on the screen, and let the user undo it if desired;

Wait a bit before drawing the ink, to see if a synchronous partner is interpreting the pen movement as a stitch;

Automatically undo the ink trail once the user's gesture is recognized as a synchronous stitch between two computers.

Any of these can be used, but the final option is likely to be most advantageous in many embodiments. Note that leaving an ink trail is used for illustrative purposes, and could be any other command or mode that the pen contact with the screen might have triggered.

Pen ID vs. Stitching

Even if a unique ID exists for each pen or stylus, stitching remains a relevant and useful tool, for example for the following reasons:

Stitching provides the command semantics, parameters, and operands; Pen ID identifies the cursor as coming from a particular pen.

Stitching does not require a unique ID to recognize a unitary act with the pen that spans two devices. Hence it is possible to implement Pick+Drop-like interactions on devices that do not support unique ID. For example, no commercially available Tablet PC's or Pocket PC's currently support a Pen ID feature.

With stitching interfaces we consider features and capabilities not considered by Pick+Drop, such as the possibility to combine two screens in multiple different ways, and to automatically calibrate the spatial relationship between two screens.

PenID still has the issue of inadvertent interaction with the other user's screen (e.g. pointing to that user's screen while talking). Is the user pointing, or trying to link together the two screens?

Stitching recognition could be more robust with PenID: i.e., there would be no doubt that a movement represented a continuation of a movement that began on another screen, since the ID of the pen would be verifiable on each device. In embodiments without PenID, the timing and dynamics of the movement are relied upon to infer this.

Hence, PenID and Stitching complement one another. It is not necessary to use pen IDs in order to implement and foster a collaboration space that spans multiple pen-aware devices. However, this doesn't mean that there are no advantages to be gained by being able to access Pen IDs, i.e. being able to elucidate undoubtedly the identity of a user behind an interaction.

Although the present invention has been described with reference to preferred embodiments, workers skilled in the art will recognize that changes may be made in form and detail without departing from the spirit and scope of the invention. For example, while some embodiments are described specifically with respect to tablet computing devices, the present invention can be used with other mobile computing devices as well. As a second example, while some embodiments of the present invention are described with reference to detecting proximity of a stylus to the mobile computing device, one of skill in the art will understand that detecting proximity of the stylus relative to the mobile computing device includes detecting contact between the stylus and the mobile computing device.

What is claimed is:

1. A method of coordinating resources of mobile computing devices to jointly execute tasks, the method comprising:

receiving a first user gesture input at a first mobile computing device;

receiving a second user gesture input at a second mobile computing device, wherein the first and second gesture inputs are received respectively at the first and second mobile computing devices;

determining whether the first and second user gesture inputs together form one of a plurality of different synchronous gesture types, wherein determining whether the first and second gesture inputs received at the first and second mobile computing devices form one of the plurality of different synchronous gesture types further comprises determining whether the first and second user gesture inputs received at the first and second mobile computing devices are of corresponding types and are synchronized in time by being received within a predetermined time period of each other; and combining resources of the first and second mobile computing devices, in response to a determination being made that the first and second user gesture inputs received at the first and second mobile computing devices are of corresponding types and are synchronized in time to form one of the plurality of synchronous gesture types, to jointly execute a particular task associated with the one of the plurality of different synchronous gesture types.

2. The method of claim 1, wherein receiving the first gesture input further comprises receiving an output of an accelerometer of the first mobile computing device, and wherein receiving the second gesture input further comprises receiving an output of an accelerometer of the second mobile computing device.

3. The method of claim 2, wherein the outputs of the accelerometers of the first and second mobile computing devices are indicative of whether the first and second mobile computing devices have been bumped against one another, thereby forming a bump type synchronous gesture.

4. The method of claim 3, and further comprising:

receiving a touch sensor output from the first mobile computing device indicative of whether the first mobile computing device is being held during a potential bump type synchronous gesture; and wherein determining whether the first and second gesture inputs form the bump type synchronous gesture comprises determining that the first and second gesture inputs form the bump type synchronous gesture only if the touch sensor output indicates that the first mobile computing device is being held.

5. The method of claim 1, wherein receiving the first gesture input further comprises receiving an input which is indicative of proximity of a stylus to a screen of the first mobile computing device, and wherein receiving the second gesture input further comprises receiving an input which is indicative of proximity of a stylus to a screen on the second mobile computing device.

6. The method of claim 5, wherein proximity of the stylus to one or both of the first and second mobile computing devices includes contact of the stylus with one or both of the first and second mobile computing devices.

7. The method of claim 6, wherein the first and second gesture inputs are indicative of whether a stitch type synchronous gesture has been formed.

8. The method of claim 7, wherein the first and second gesture inputs are indicative of whether a scribble type synchronous gesture has been formed.

9. The method of claim 1, wherein combining resources of the first and second mobile computing devices to jointly execute the task associated with the one of the plurality of different synchronous gesture types further comprises combining resources of the first and second mobile computing devices to share display real estate.

10. The method of claim 9, wherein combining resources of the first and second mobile computing devices to share display real estate further comprises combining resources of the first and second mobile computing devices to jointly display the same image.

11. The method of claim 9, wherein combining resources of the first and second mobile computing devices to share display real estate further comprises combining resources of the first and second mobile computing devices to each display different portions of a single image.

12. The method of claim 1, wherein combining resources of the first and second mobile computing devices to jointly execute the task associated with the one of the plurality of different synchronous gesture types further comprises combining resources of the first and second mobile computing devices to transfer data from the first mobile computing device to the second mobile computing device.

13. A system which coordinates resources of mobile computing devices to jointly execute tasks, the system comprising:
a first mobile computing device configured to receive a first user gesture input; a second mobile computing device configured to receive a second user gesture input; processing circuitry configured to determine whether the first and second user gesture inputs together form one of a plurality of different synchronous gesture types by determining whether the first and second gesture inputs are of corresponding types and are synchronized in time by being received within a predetermined time period of each other; and
the first and second mobile computing devices being further configured to combine resources in response to a determination being made that the first and second user gesture inputs received at the first and second mobile computing devices are of corresponding types and are synchronized in time to form one of the plurality of synchronous gesture types, to jointly execute a particular task associated with the one of the plurality of different synchronous gesture types.

14. The system of claim 13, and further comprising a network communicatively coupling the first and second mobile computing devices.

15. The system of claim 14, wherein the processing circuitry comprises processing circuitry of one or both of the first and second mobile computing devices.

16. The system of claim 14, wherein the processing circuitry comprises processing circuitry of the network.

17. The system of claim 16, wherein the processing circuitry further comprises a proximity server.

18. The system of claim 13, and further comprising an accelerometer coupled to the first mobile computing device and an accelerometer coupled to the second mobile computing device, wherein the first gesture input is an output of the accelerometer coupled to the first mobile computing device, and wherein the second gesture input is an output of the accelerometer coupled to the second mobile computing device.

19. The system of claim 18, wherein the outputs of the accelerometers coupled to the first and second mobile computing devices are indicative of whether the first and second mobile computing devices have been bumped against one another, thereby forming a bump type synchronous gesture.

20. The system of claim 19, and further comprising:
a touch sensor coupled to the first mobile computing device, the first mobile computing device being further configured to receive a touch sensor output indicative of whether the first mobile computing device is being held during a potential bump type synchronous gesture; and
wherein the processing circuitry is further configured to determine whether the first and second gesture inputs form the bump type synchronous gesture only if the touch sensor output indicates that the first mobile computing device is being held.

21. The system of claim 13, wherein the first mobile computing device is configured to receive the first gesture input by receiving an input which is indicative of proximity of a stylus to a screen of the first mobile computing device, and wherein the second mobile computing device is configured to receive the second gesture input by receiving an input which is indicative of proximity of a stylus to a screen on the second mobile computing device.

22. The system of claim 21, wherein proximity of the stylus to one or both of the first and second mobile computing devices includes contact of the stylus with one or both of the first and second mobile computing devices.

23. The system of claim 22, wherein the first and second gesture inputs are indicative of whether a stitch type synchronous gesture has been formed.

24. The system of claim 23, wherein the first and second gesture inputs are indicative of whether a scribble type synchronous gesture has been formed.

25. The system of claim 13, wherein the first and second mobile computing devices are configured to combine resources by sharing display real estate.

26. The system of claim 25, wherein the first and second mobile computing devices are configured to share display real estate by jointly display the same image.

27. The system of claim 26, wherein the first and second mobile computing devices are configured to jointly display the same image by each displaying different portions of a single image.

28. The system of claim 13, wherein the first and second mobile computing devices are configured to combine resources to transfer data from the first mobile computing device to the second mobile computing device.

* * * * *